(12) United States Patent
Yang et al.

(10) Patent No.: US 9,849,873 B2
(45) Date of Patent: Dec. 26, 2017

(54) VEHICLE AND COASTING FEEDBACK CONTROL METHOD FOR THE SAME

(71) Applicant: BYD COMPANY LIMITED, Shenzhen, Guangdong (CN)

(72) Inventors: Dongsheng Yang, Shenzhen (CN); Yubo Lian, Shenzhen (CN); Jintao Zhang, Shenzhen (CN); Hongbin Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/216,279

(22) Filed: Jul. 21, 2016

(65) Prior Publication Data

US 2016/0325728 A1    Nov. 10, 2016

Related U.S. Application Data

(63) Continuation of application No. PCT/CN2014/089829, filed on Oct. 29, 2014.

(30) Foreign Application Priority Data

Jan. 30, 2014    (CN) .......................... 2014 1 0044627

(51) Int. Cl.
*B60W 20/14* (2016.01)
*B60K 6/38* (2007.10)
(Continued)

(52) U.S. Cl.
CPC ............. *B60W 20/14* (2016.01); *B60K 6/387* (2013.01); *B60K 6/50* (2013.01); *B60K 6/52* (2013.01); *B60L 3/108* (2013.01); *B60L 3/12* (2013.01); *B60L 7/14* (2013.01); *B60L 7/26* (2013.01); *B60L 11/123* (2013.01); *B60L 11/14* (2013.01); *B60L 11/1861* (2013.01);
(Continued)

(58) Field of Classification Search
CPC ....... B60W 20/14; B60W 10/06; B60K 6/387; B60L 3/108; B60L 7/14
See application file for complete search history.

(56) References Cited

FOREIGN PATENT DOCUMENTS

| CN | 101209675 A | 7/2008 |
|---|---|---|
| CN | 102030005 A | 4/2011 |

(Continued)

OTHER PUBLICATIONS

International Search Report and Written Opinion for Application No. PCT/CN2014/089829, dated Jan. 28, 2015, 12 pages.

*Primary Examiner* — Basil T. Jos

(57) ABSTRACT

The present disclosure discloses a vehicle and a coasting feedback control method for the same. The coasting feedback control method includes the following steps: detecting the current speed of a vehicle, the depth of a braking pedal of the vehicle, and the depth of an accelerator pedal; and when the current speed of the vehicle is greater than a preset speed, both the depth of the braking pedal and the depth of the accelerator pedal are 0, and the current gear of the vehicle is gear D, when the vehicle is not in a cruise control mode and an anti-lock braking system of the vehicle is in a non-working state, controlling the vehicle to enter a coasting feedback control mode, where when the vehicle is in the coasting feedback control mode, a coasting feedback torque of a first motor generator and a coasting feedback torque of a second motor generator are distributed according to a selected coasting feedback torque curve of the vehicle.

20 Claims, 22 Drawing Sheets

(51) Int. Cl.
<table>
<tr><td>B60L 3/10</td><td>(2006.01)</td></tr>
<tr><td>B60L 7/14</td><td>(2006.01)</td></tr>
<tr><td>B60W 10/06</td><td>(2006.01)</td></tr>
<tr><td>B60W 10/08</td><td>(2006.01)</td></tr>
<tr><td>B60W 10/10</td><td>(2012.01)</td></tr>
<tr><td>B60W 20/00</td><td>(2016.01)</td></tr>
<tr><td>B60W 30/18</td><td>(2012.01)</td></tr>
<tr><td>B60W 40/10</td><td>(2012.01)</td></tr>
<tr><td>B60W 40/105</td><td>(2012.01)</td></tr>
<tr><td>B60L 3/12</td><td>(2006.01)</td></tr>
<tr><td>B60L 7/26</td><td>(2006.01)</td></tr>
<tr><td>B60L 11/12</td><td>(2006.01)</td></tr>
<tr><td>B60L 11/14</td><td>(2006.01)</td></tr>
<tr><td>B60L 11/18</td><td>(2006.01)</td></tr>
<tr><td>B60L 15/20</td><td>(2006.01)</td></tr>
<tr><td>B60K 6/387</td><td>(2007.10)</td></tr>
<tr><td>B60K 6/50</td><td>(2007.10)</td></tr>
<tr><td>B60K 6/52</td><td>(2007.10)</td></tr>
</table>

(52) U.S. Cl.
CPC ........... *B60L 11/1864* (2013.01); *B60L 15/20* (2013.01); *B60L 15/2009* (2013.01); *B60L 15/2045* (2013.01); *B60L 15/2054* (2013.01); *B60W 10/06* (2013.01); *B60W 10/08* (2013.01); *B60W 10/10* (2013.01); *B60W 20/00* (2013.01); *B60W 30/18* (2013.01); *B60W 30/18127* (2013.01); *B60W 40/10* (2013.01); *B60W 40/105* (2013.01); *B60L 2210/30* (2013.01); *B60L 2210/40* (2013.01); *B60L 2220/44* (2013.01); *B60L 2220/46* (2013.01); *B60L 2240/12* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/445* (2013.01); *B60L 2240/486* (2013.01); *B60L 2240/507* (2013.01); *B60L 2240/547* (2013.01); *B60L 2240/549* (2013.01); *B60L 2250/26* (2013.01); *B60L 2260/24* (2013.01); *B60L 2260/28* (2013.01); *B60L 2260/30* (2013.01); *B60L 2270/12* (2013.01); *B60L 2270/145* (2013.01); *B60W 2510/1005* (2013.01); *B60W 2510/244* (2013.01); *B60W 2520/10* (2013.01); *B60W 2540/10* (2013.01); *B60W 2540/12* (2013.01); *B60W 2550/142* (2013.01); *B60W 2710/0666* (2013.01); *B60W 2710/083* (2013.01); *B60Y 2200/92* (2013.01); *B60Y 2300/18066* (2013.01); *B60Y 2300/43* (2013.01); *B60Y 2300/60* (2013.01); *B60Y 2400/82* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/7241* (2013.01); *Y02T 10/7283* (2013.01); *Y02T 10/76* (2013.01); *Y02T 10/92* (2013.01); *Y10S 903/914* (2013.01); *Y10S 903/916* (2013.01); *Y10S 903/93* (2013.01)

(56) References Cited

FOREIGN PATENT DOCUMENTS

| CN | 103183026 A | 7/2013 |
|---|---|---|
| JP | S6343856 A | 2/1988 |

VEHICLE AND COASTING FEEDBACK CONTROL METHOD FOR THE SAME

CROSS-REFERENCE TO RELATED APPLICATIONS

This application is a continuation application of International Application No. PCT/CN2014/089829, filed on Oct. 29, 2014, which is based on and claims priority to and benefits of Chinese Patent Application Serial No. 201410044627.7, filed with the State Intellectual Property Office of P. R. China on Jan. 30, 2014. The entire contents of the above-referenced applications are incorporated herein by reference.

FIELD

The present disclosure relates to the technical field of vehicles, and more particularly to a coasting feedback control method for a vehicle and a vehicle.

BACKGROUND

A hybrid electric vehicle normally includes a power battery. How to fully increase energy efficiency of driving of a vehicle to further extend the mileage of the vehicle is a critical problem that needs to be resolved for a hybrid electric vehicle. Energy feedback is one of the technical measures for resolving the problem.

In the related art, a method and a system for recycling coasting energy of an automobile are provided, including a coasting feedback part with an accelerator pedal released. For the method and the system, although influence on the efficiency of energy feedback by the current speed, the state of a power system (for example, the state of a battery and a motor), a rated coasting deceleration curve, and the like are considered, a rated deceleration curve in coasting feedback control when an accelerator pedal is released is simple and experience of a driver and maximization of energy feedback are not fully considered. Therefore, a technology of coasting feedback control with an accelerator pedal released for an automobile in the related art needs to be improved.

SUMMARY

An objective of the present disclosure is to at least resolve the foregoing technical disadvantages.

A first objective of the present disclosure is to provide a coasting feedback control method for a vehicle that can maximize energy recycling in the premise of ensuring the driving comfort of the vehicle, thus increasing energy feedback efficiency.

A second objective of the present disclosure is to provide a vehicle with coasting feedback control.

To achieve the foregoing objectives, an embodiment of a first aspect of the present disclosure provides a coasting feedback control method for a vehicle, where the vehicle includes an engine unit, a transmission unit adapted to selectively couple with the engine unit and configured to transmit the power generated by the engine unit, a first motor generator coupled with the transmission unit, an output unit, a power switching device, a second motor generator configured to drive at least one of front and rear wheels of the vehicle, and a power battery for supplying power to the first motor generator and the second motor generator, where the output unit is configured to transmit the power transmitted by the transmission unit to at least one of the front and rear wheels of the vehicle, and the power switching device is adapted to enable or interrupt power transmission between the transmission unit and the output unit. The coasting feedback control method includes the following steps: detecting a current speed of the vehicle and the depth of a braking pedal and the depth of an accelerator pedal of the vehicle; when the current speed of the vehicle is greater than a preset speed, both the depth of the braking pedal and the depth of the accelerator pedal are 0, the current gear of the vehicle is gear D, the vehicle is not in a cruise control mode, and an anti-lock braking system of the vehicle is in a non-working state, controlling the vehicle to enter a coasting feedback control mode, where when the vehicle is in the coasting feedback control mode, a coasting feedback torque of the first motor generator and a coasting feedback torque of the second motor generator are distributed according to a selected coasting feedback torque curve of the vehicle.

For the coasting feedback control method for a vehicle according to embodiments of the present disclosure, during coasting feedback control of the vehicle, a coasting feedback torque of the first motor generator and a coasting feedback torque of the second motor generator are distributed according to a selected coasting feedback torque curve of the vehicle. Therefore, the feedback efficiency of the vehicle, the operation mode of the vehicle, the ride comfort and the steering capability of the vehicle, and the like may be fully considered, so that the energy recycling can be maximized in the premise of ensuring the driving comfort of the vehicle, thus effectively increasing the mileage of the vehicle, reducing the discharge of pollutants and the wear caused by mechanical braking, and increasing the energy feedback efficiency of the vehicle. In some embodiments of the present disclosure, power output by the engine unit and/or a first motor generator may be output to an output unit via a power switching device, and the output unit then outputs the power to at least one of front and rear wheels of the vehicle. Further, because of the provision of a second motor generator, the second motor generator may perform torque compensation for at least one of front and rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases. In addition, the method is simple and reliable and is easy to implement.

To achieve the foregoing objectives, an embodiment of a second aspect of the present disclosure provides a vehicle, including: an engine unit; a transmission unit, where the transmission unit is adapted to selectively couple with the engine unit and also configured to transmit the power generated by the engine unit; a first motor generator, where the first motor generator is coupled with the transmission unit; an output unit, where the output unit is configured to transmit the power transmitted by the transmission unit to at least one of the front and rear wheels of the vehicle; a power switching device, where the power switching device is adapted to enable or interrupt power transmission between the transmission unit and the output unit; a second motor generator, where the second motor generator is configured to drive at least one of the front and rear wheels; a power battery, where the power battery is respectively connected to the first motor generator and the second motor generator to supply power to the first motor generator and the second motor generator; and a controller, where when the current speed of the vehicle is greater than a preset speed and both the depth of the braking pedal and the depth of the accelerator pedal of the vehicle are 0, the current gear of the vehicle is gear D, the vehicle is not in a cruise control mode, and an anti-lock braking system of the vehicle is in a non-working state, the controller controls the vehicle to enter a coasting feedback control mode, and when the vehicle is in the coasting feedback control mode, the controller distributes a coasting feedback torque of the first motor generator and a coasting feedback torque of the second motor generator according to a selected coasting feedback torque curve of the vehicle.

For the vehicle according to embodiments of the present disclosure, during coasting feedback control, a coasting feedback torque of the first motor generator and a coasting feedback torque of the second motor generator can be distributed according to a selected coasting feedback torque curve of the vehicle. Therefore, the energy feedback efficiency, the operation mode, the ride comfort and the steering capability, and the like can be fully considered, energy recycling can be maximized in the premise of ensuring the driving comfort, thus effectively increasing the mileage, reducing the discharge of pollutants and the wear caused by mechanical braking, and increasing the energy feedback efficiency. Meanwhile, in some embodiments of the present disclosure, power output by the engine unit and/or a first motor generator may be output to an output unit via a power switching device, and the output unit then outputs the power to at least one of front and rear wheels of the vehicle. Further, because of the provision of a second motor generator, the second motor generator may perform torque compensation on at least one of front and rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

Additional aspects and advantages of the present disclosure will be given in part in the following descriptions, become apparent in part from the following descriptions, or be learned from the practice of the present disclosure.

BRIEF DESCRIPTION OF THE DRAWINGS

The foregoing and other aspects and advantages of the present disclosure will become apparent and more readily appreciated from the following descriptions of the embodiments made with reference to the drawings, in which.

DETAILED DESCRIPTION

Figure 1:
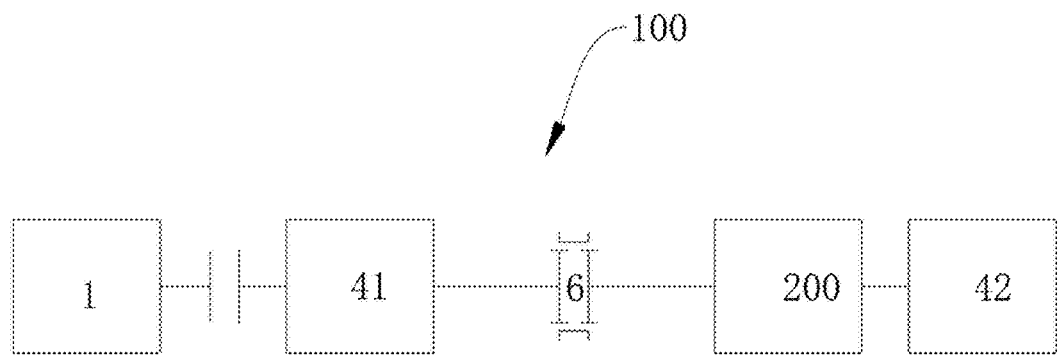
FIG. 1 is a principle diagram of a power transmission system according to an embodiment of the present disclosure.

Reference will be made in detail to embodiments of the present disclosure. The embodiments described herein with reference to drawings are explanatory, illustrative, and should be used to generally understand the present disclosure. The embodiments shall not be construed to limit the present disclosure. The same or similar elements and the elements having same or similar functions are denoted by like reference numerals throughout the descriptions.

The disclosure below provides many different embodiments or examples to implement different structures of the present disclosure. To simplify the disclosure of the present disclosure, the components and settings in the specific examples below are described. These are merely examples, and the objective is not to limit the present disclosure. In addition, in the present disclosure, reference numerals and/or letters may be repeated in different examples. Such repetition is for the purpose of simplification and clarity, but the repeated numerals and/or letters do not indicate relationships between discussed various embodiments and/or settings. In addition, the present disclosure provides examples of various specific processes and materials, but a person of ordinary skill in the art may realize applicability of another process and/or use of another material. In addition, the structure in which the first feature is "on" the second feature described below may include an embodiment in which the first and second features are form directly contacting each other, or may include an embodiment in which an additional feature is formed between the first and second features, so that the first and second features may not contact directly.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct mountings, connections, and couplings and indirect mountings, connections, and couplings by using an intermediate medium, and the specific meanings of the foregoing terms can be understood by those skilled in the art according to the specific cases.

Referring to the descriptions below and the accompanying drawings, these and other aspects of embodiments of the present disclosure will become clear. In these descriptions and the accompanying drawings, some specific implementation manners In some embodiments of the present disclosure are specifically disclosed, to represent some manners of implementing the principles of embodiments of the present disclosure. However, it would be appreciated that the scope of embodiments of the present disclosure is not limited to this. In contrast, embodiments of the present disclosure include all changes, modifications, and equivalents that fall within the spirit and scope of the appended claims.

A power transmission system 100 according to embodiments of the present disclosure will be described in detail below with reference to FIGS. 1-19. The power transmission system 100 is applicable to a vehicle, such as a hybrid vehicle with an engine unit 1 and a motor generator.

As shown in the figures, the power transmission system 100 according to embodiments of the present disclosure may include an engine unit 1, a transmission unit 2a, a first motor generator 41, a second motor generator 42, an output unit 5, and a power switching device (e.g., a synchronizer 6, and a clutch 9).

The transmission unit 2a is adapted to be selectively coupled with the engine unit 1. The engine unit 1 may selectively output a power generated by the engine unit 1 to the transmission unit 2a via the clutch 9 or the like. Alternatively, the transmission unit 2a may also output, for example, a starting torque from the first motor generator 41 to the engine unit 1, so as to start the engine unit 1. In the context of the present disclosure, the phrase "the transmission unit 2a is coupled with the engine unit 1" means that the power can be transferred between the engine unit 1 and the transmission unit 2a directly or via other components, and the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may generally adopt a four-stroke gasoline or diesel engine. The engine unit 1 may generally include a block, a crank-connecting rod mechanism, a valve mechanism, a supply system, an ignition system, a cooling system, a lubrication system and the like.

The block is an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the foregoing engine unit 1 as well as specific structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thus to the first motor generator 41 via the transmission unit 2a, and the first motor generator 41 may generate electricity and convert mechanical energy into electric energy to be stored in an energy storage component such as a battery component. As another example, the first motor generator 41 may convert electric energy from the battery component into mechanical energy, and output the mechanical energy to the output unit 5 via the transmission unit 2a to drive the vehicle.

The first motor generator 41 is a motor having functions of both a motor and a generator. As used in the present disclosure, the term "motor generator" refers to a motor having functions of both a motor and a generator, unless specified otherwise.

The output unit 5 is configured to transmit a power transmitted by the transmission unit 2a to wheels 200 (e.g., one of front and rear wheels 210 and 220) of the vehicle. The output unit 5 is adapted to output the power from the transmission unit 2a.

The power switching device such as the synchronizer 6 is adapted to enable or interrupt a power transmitting between the output unit 5 and the transmission unit 2a. In other words, the power switching device may output the power output from the transmission unit 2a to at least one of front and rear wheels 210, 220 via the output unit 5, or the power switching device may also disconnect the transmission unit 2a from the output unit 5 and the transmission unit 2a may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present disclosure, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the number of operation modes of the vehicle. Therefore, the vehicle may be adapted to different operating conditions, thus achieving better fuel economic efficiency while reducing the emission of harmful gases.

In some embodiments of the present disclosure, as shown in FIGS. 1-16, the power switching device is configured as a synchronizer 6, and the synchronizer 6 is adapted to selectively synchronize between the output unit 5 and the transmission unit 2a, so as to output the power via the output unit 5 to drive the wheels 200 of the vehicle.

The function of the synchronizer 6 may be to eventually synchronize the output unit 5 and the transmission unit 2a, i.e., under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

The synchronizer 6 functions to switch the power. That is, when the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Because of special application scenarios, the synchronizer 6 has the following advantages.

a. When the synchronizer 6 is in a disengaged state, the power transmitting between the engine unit 1, the transmission unit 2a, the first motor generator 41 and the wheels 200 can be severed, such that operations such as electricity generation, driving, and power/torque transmission may not influence each other, which is very important in reducing the energy consumption of the vehicle. The synchronizer 6 may meet this requirement well, while incomplete separation of friction plates usually occurs in the clutch, thus increasing the friction loss and energy consumption.

b. When the synchronizer 6 is in an engaged state, the synthesized (coupled) driving force of the engine unit 1 and the first motor generator 41 can be transferred to the wheels 200 after the torque multiplication of the transmission unit 2a, or the driving force of the wheels 200 can be transferred to the first motor generator 41 to generate electricity, both of which require that the power coupling device transmit a large torque and have high stability. The synchronizer 6 may meet this requirement well. However, if a clutch is used, an oversize clutch which does not match with the entire system (including an engine, a transmission, a motor, etc.) needs to be designed, thus increasing the arrangement difficulty, the weight and the cost, and having the risk of slipping under the action of an impact torque.

Moreover, the first motor generator 41 may adjust the speed of the transmission unit 2a, for example, the first motor generator 41 may adjust the speed of the transmission unit 2a with the rotating speed of the output unit 5 as a target value, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present disclosure is compact in structure and easy to control.

In some embodiments of the present disclosure, as shown in FIGS. 2-7, the transmission unit 2a includes a transmission power input part 21a and a transmission power output part 22a. The transmission power input part 21a is selectively engaged with the engine unit 1 to transmit the power generated by the engine unit 1. The transmission power output part 22a is configured to output the power from the transmission power input part 21a to the output unit 5 via the synchronizer 6.

As shown in FIGS. 2-7, the transmission power input part 21a further includes an input shaft (e.g., a first input shaft 21, a second input shaft 22) and a driving gear 25 mounted on the input shaft. The input shaft is selectively engaged with the engine unit 1 to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below, and is no longer elaborated herein.

As shown in FIGS. 2-7, the transmission power output part 22a includes an output shaft 24, and a driven gear 26 mounted on the output shaft 24 and configured to mesh with the driving gear 25 on the input shaft.

As shown in FIGS. 2-5, the output shaft 24 is configured to output at least a part of the power transmitted by the input shaft. Specifically, the output shaft 24 and the input shaft cooperate with each other to transmit the power. For example, preferably, the power transmission between the output shaft 24 and the input shaft may be realized by means of the driving gear 25 and the driven gear 26.

It would be appreciated that the power transmission between the output shaft 24 and the input shaft is not limited to this. For example, the power transmission between the output shaft 24 and the input shaft may also be realized by means of a belt transmission mechanism, a rack and pinion transmission mechanism or the like. For example, a suitable structure and manner of may be specifically selected according to practical applications by a person skilled in the art.

The output shaft 24 is configured to transmit at least a part of the power on the input shaft. For example, when the power transmission system 100 is in a certain transmission mode where for example, the first motor generator 41 generates electricity, a part of the power on the input shaft may be used for the electricity generating of the first motor generator 41, and the other part of the power on the input shaft may be used to drive the vehicle to run. Certainly, all power on the input shaft may be used for the electricity generation of the first motor generator 41.

In some embodiments of the present disclosure, the power transmitting between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 can be directly and rigidly connected with one of the input shaft and the output shaft 24. The direct power transmission has the advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has the advantages of enabling convenient arrangement and achieving the desired transmission ratio by providing a speed changing device and the like.

The output unit 5 may be used as a power output terminal of the output shaft 24 for outputting the power on the output shaft 24. The output unit 5 and the output shaft 24 may rotate differentially and not synchronously. In other words, there can be a rotating speed difference between the output unit 5 and the output shaft 24, and the output unit 5 and the output shaft 24 are not rigidly fixed with each other.

The synchronizer 6 is disposed on the output shaft 24. As shown in FIGS. 1-6, the synchronizer 6 may include a splined hub 61 and a synchronizing sleeve 62. The splined hub 61 may be fixed on the output shaft 24 such that the splined hub 61 can rotate synchronously with the output shaft 24, while the synchronizing sleeve 62 may move in an axial direction of the output shaft 24 relative to the splined hub 61 so as to selectively engage with the output unit 5, such that the output unit 5 can rotate synchronously with the output shaft 24. In this way, the power may be transferred from the output unit 5 to the front and/or rear wheels 210, 220, thus driving the wheels 200. However, it would be appreciated that the structure of the synchronizer 6 is not limited to this.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating modes of the vehicle, it is possible for the synchronizer 6 to switch from a disengaged state to an engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss, and realizing no torque engagement of the synchronizer 6. Furthermore, the radial frictional force is much smaller than the average value in the related art or even there is no radial frictional force during the engagement of the synchronizer 6.

In some embodiments of the present disclosure, the output unit 5 is configured to drive a first pair of wheels of the vehicle, and there is a pair of second motor generators 42 configured to drive the first pair of wheels. Further, there may be a plurality of second motor generators. For example, the power transmission system 100 further includes a third motor generator 43 configured to drive a second pair of wheels of the vehicle. For example, as shown in FIGS. 2-8, the first pair of wheels refers to the front wheels 210 of the vehicle, and the second pair of wheels refers to the rear wheels 220 of the vehicle. It is understood that in other embodiments, the first pair of wheels can refer to the rear wheels 220 and the second pair of wheels can refer to the front wheels 210.

Therefore, the power transmission system 100 according to embodiments of the present disclosure has four types of power output sources, i.e. the engine unit 1, the first motor generator 41, the second motor generator 42 and the third motor generator 43, in which the engine unit 1, the first motor generator 41 and the second motor generator 42 may be configured to drive one pair of wheels of the vehicle, and the third motor generator 43 may be configured to drive the other pair of wheels of the vehicle. Therefore, the vehicle having the power transmission system 100 is operable as a four-wheel drive vehicle.

Moreover, during the switching of operating modes of the vehicle, it is possible for the synchronizer 6 to switch from the disengaged state to the engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by the provision of the second motor generator 42 and the third motor generator 43, the second motor generator 42 and the third motor generator 43 may compensate for the torque of the wheels 200, which is indirectly reflected in the output of the output unit 5. That is, the second motor generator 42 and the third motor generator 43 may indirectly adjust the rotating speed of the output unit 5. For example, when the synchronizer 6 switches from the disengaged state to the engaged state, the second motor generator 42 and the third motor generator 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generator 42 and the third motor generator 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

Optionally, the first motor generator 41 may adjust the rotating speed of the output unit 5 separately. Alternatively, optionally, at least one of the second motor generator 42 and the third motor generator 43 may adjust the rotating speed of the output unit 5 separately. Furthermore, optionally, the first motor generator 41, the second motor generator 42 and the third motor generator 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generator 42 and the third motor generator 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments of the present disclosure, as shown in FIGS. 2-9, there is a plurality of the input shafts, i.e. two or more input shafts. The input shafts are coaxially and sequentially nested. For example, if there are N input shafts, the $K^{th}$ input shaft is fitted over the $(K-1)^{th}$ input shaft, where $N \geq K \geq 2$, and central axes of the N input shafts coincide with each other.

For example, as shown in FIGS. 2-7 and 9-19, when there are two input shafts, e.g. the first input shaft 21 and the second input shaft 22, the second input shaft 22 is fitted over the first input shaft 21 and central axes of the two input shafts coincide with each other. As another example, as shown in FIG. 8, when there are three input shafts, e.g. the first input shaft 21, the second input shaft 22 and a third input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmitting, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIGS. 2-6, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

A plurality of driven gears 26 is fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present disclosure is not limited to this. For example, the number of the driving gears 25 on each input shaft is not limited to one, and accordingly a plurality of driven gears 26 is fixed on the output shaft 24 to form a plurality of gears, which is implementable to a person skilled in the art.

As shown in FIGS. 2-6, the driven gears 26 are configured to mesh with the driving gears 25 on the input shafts respectively. In one embodiment of the present disclosure, the number of the driven gears 26 may be the same as that of the input shafts. For example, when there are two driven gears 26, there are two input shafts, such that the two driven gears 26 may be configured to mesh with the driving gears 25 on the two input shafts to transmit the power, so as to make the two pairs of gears form two gears for power transmitting.

In an embodiment of the present disclosure, three or more input shafts may be provided according to the power transmitting requirements, and each input shaft may be provided with one driving gear 25. Therefore, the larger the number of the input shafts, the larger the number of the gears is, and the wider range of the transmission ratio of the power transmission system 100 is, so as to adapt to the power transmitting requirements of various vehicles.

In some specific embodiments of the present disclosure, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

The first input shaft 21 may be supported by bearings. For example, a plurality of bearings can be preferably disposed in an axial direction of the first input shaft 21 at a position not influencing the assembly of other components. Similarly, the second input shaft 22 may also be supported by bearings.

Further, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is connected to the input terminal 313 of the dual clutch 31. The engine unit 1 may be connected to the input terminal 313 of the dual clutch 31 via for example, a flywheel, a damper, or a torsion plate.

The first output terminal 311 of the dual clutch 31 is connected to and rotates synchronously with the first input shaft 21. The second output terminal 312 of the dual clutch 31 is connected to and rotates synchronously with the second input shaft 22.

The input terminal 313 of the dual clutch 31 may be a shell of the dual clutch 31, and the first output terminal 311 and the second output terminal 312 of the dual clutch 31 may be two driven discs. Generally, the shell may be disconnected from the two driven discs, such that the input terminal 313 is disconnected from the first output terminal 311 and the second output terminal 312. When one driven disc needs to be engaged, the shell can be controlled to engage with the corresponding driven disc to rotate synchronously with the driven disc, e.g. the input terminal 313 is engaged with one of the first output terminal 311 and the second output terminal 312, such that the power transmitted from the input terminal 313 may be output via one of the first output terminal 311 and the second output terminal 312. Generally, the shell is engaged with one driven disc at a time.

It would be appreciated that the specific engagement of the dual clutch 31 is influenced by a control strategy. For a person skilled in the art, the control strategy may be adaptively set according to the desired power transmission mode, e.g. switching between a mode in which the input terminal 313 is disconnected from the first output terminal 311 and the second output terminal 312 and a mode in which the input terminal 313 is engaged with one of the first output terminal 311 and the second output terminal 312.

For example, as shown in FIGS. 2-7, since the input shaft has a concentric dual-shaft structure and each input shaft is provided with only one driving gear 25, the transmission unit 2a has two different gears, and the engine unit 1 may output the power to the output unit 5 via the two gears, while the synchronizer 6 is always in an engaged state to engage the output shaft 24 with the output unit 5.

During the gear shift, unlike the synchronizer in the related art, the synchronizer 6 does not need to be first disengaged and then move axially to engage with other gears. Only the engagement/disengagement of the dual clutch 31 needs to be controlled, while the synchronizer 6 can remain in the engaged state. In this way, when the engine unit 1 outputs the power to the output unit 5, only one gear shift actuating component, e.g. the dual clutch 31, needs to be controlled, while the synchronizer 6 does not need to be controlled, thus simplifying the control strategy greatly, reducing the number of engagement/disengagement times of, e.g. synchronizer 6, and extending the life of the synchronizer 6.

In some embodiments of the present disclosure, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, as an optional solution, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
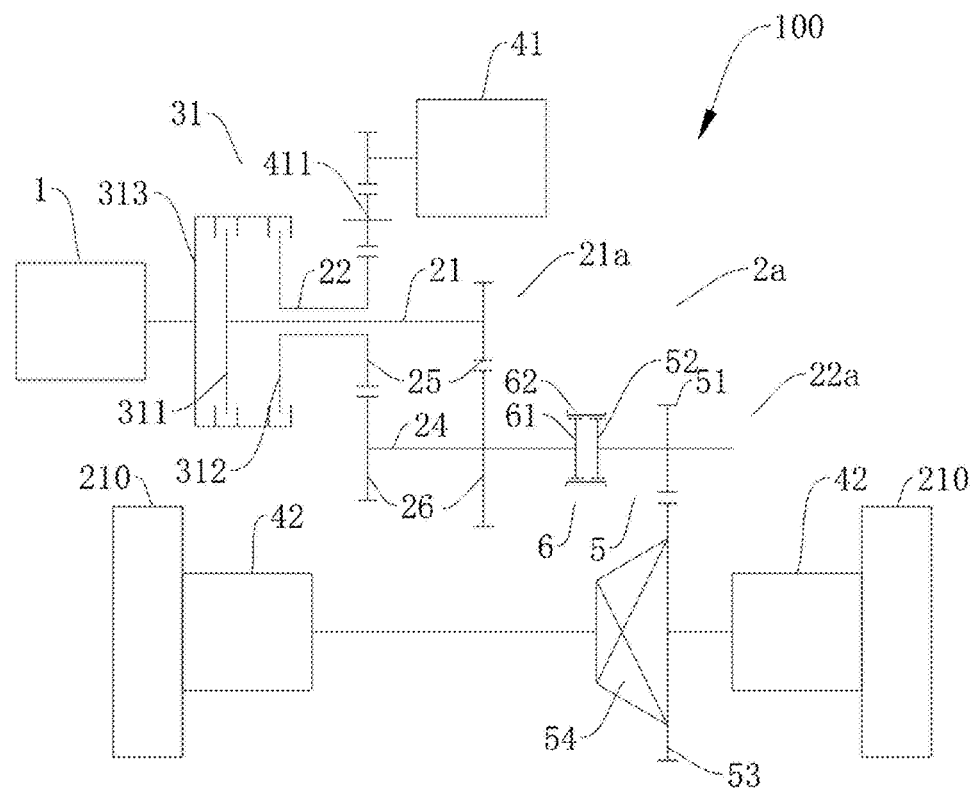
FIG. 2 is a schematic view of a power transmission system according to an embodiment of the present disclosure.
Figure 3:
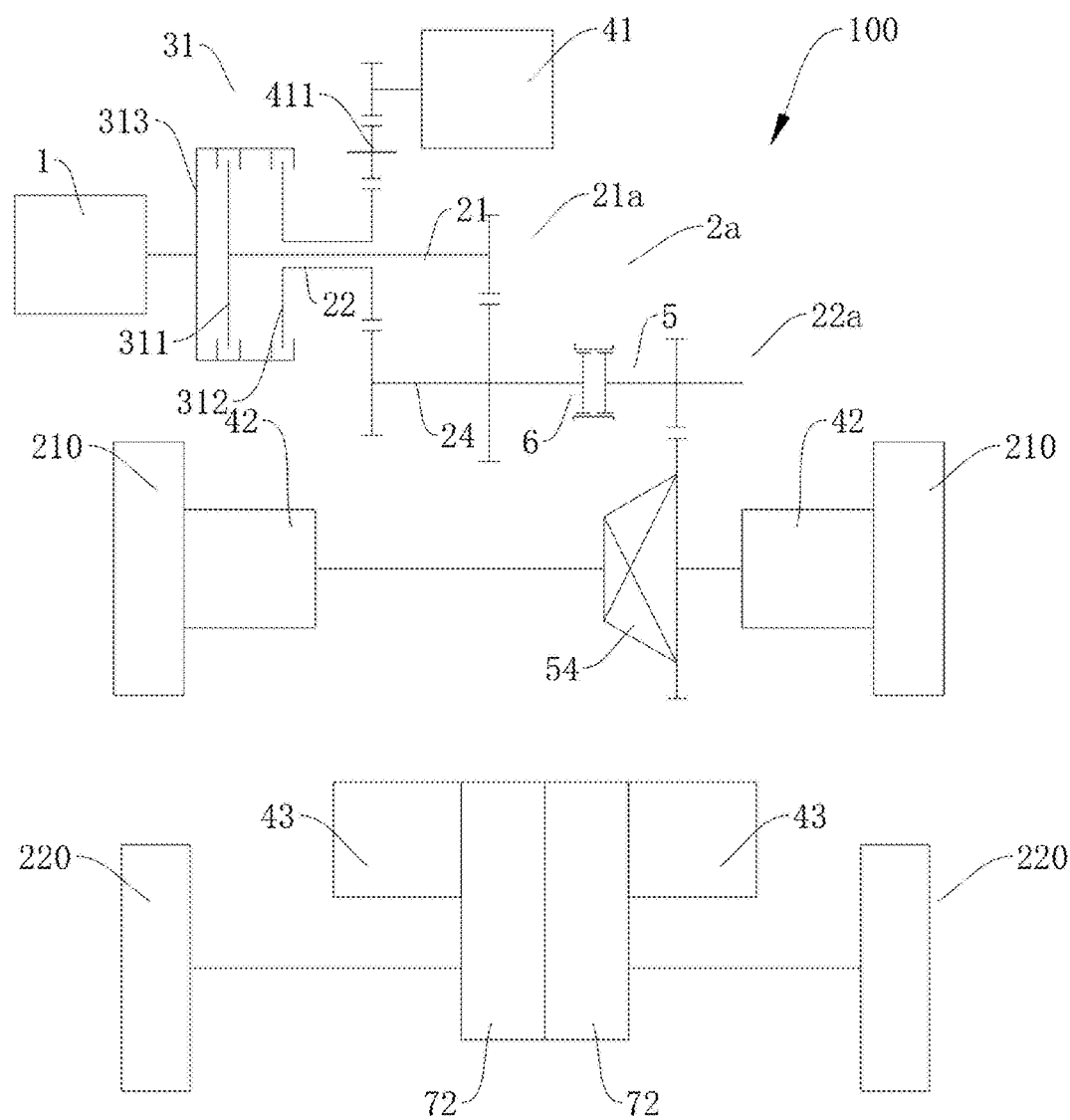
FIG. 3 is a schematic view of a power transmission system according to another embodiment of the present disclosure.

In order to facilitate the spatial arrangement, in an embodiment of the present disclosure, the first motor generator 41 may transmit the power via an intermediate gear 411. For example, as shown in FIG. 3 (with reference to FIG. 2), indirect power transmission between the first motor generator 41 and the driving gear 25 on the first input shaft 21 via the intermediate gear 411 can be performed. As another example, as shown in FIG. 2, indirect power transmission between the first motor generator 41 and the driving gear 25 on the second input shaft 22 via the intermediate gear 411 can be performed However, the present disclosure is not limited to this. In another embodiment of disclosure, the first motor generator 41 may be configured to connect with one of the first input shaft 21 and the output shaft 24. For example, the first motor generator 41 may be configured to directly connect with the first input shaft 21. As another example, the first motor generator 41 may be configured to directly connect with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
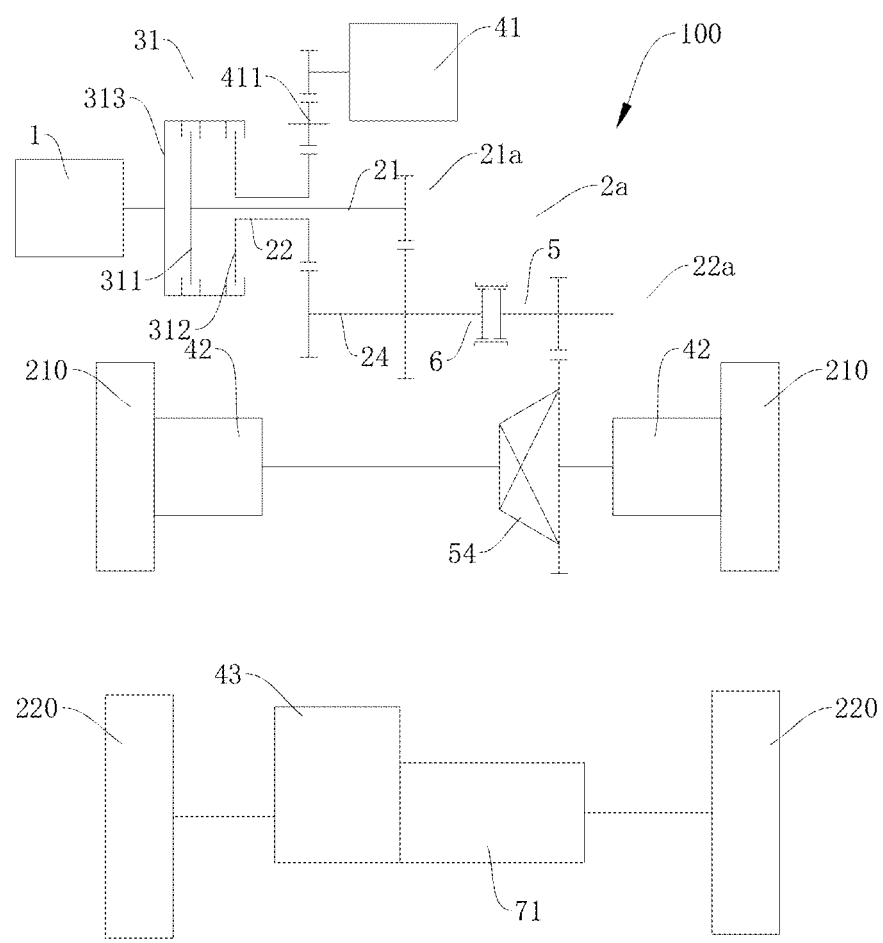
FIG. 4 is a schematic view of a power transmission system according to still another embodiment of the present disclosure.

In an embodiment of the present disclosure, as shown in FIG. 4, the first motor generator 41 is arranged coaxially with the first input shaft 21, and the first motor generator 41 is arranged coaxially with the engine unit 1. "The first motor generator 41 is arranged coaxially with the engine unit 1" would be appreciated as that a rotation axis of a rotor of the first motor generator 41 substantially coincides with a rotation axis of a crankshaft of the engine unit 1. Therefore, the power transmission system 100 becomes more compact in structure.

In some embodiments of the present disclosure, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52 to form a rigid connection between the output shaft 24, the synchronizer 6 and the output unit 5, so as to rotate the output shaft 24, the synchronizer 6 and the output unit 5 synchronously.

In order to reduce the number of intermediate transmission components, to reduce the energy loss, and to enhance the transmission efficiency of the power transmission system 100, in a preferred manner, as shown in FIGS. 2-6, the output gear 51 may be a driving gear of a final drive and is configured to directly mesh with a driven gear 53 of the final drive to output the power, so as to drive the wheels 200. However, the present disclosure is not limited to this, and other intermediate transmission components may also be disposed between the output gear 51 and the final drive.

As shown in FIGS. 2-10, a differential 54 is disposed between the first pair of wheels such as the front wheels 210. The differential 54 cooperates with the output unit 5 for power transmitting. In some embodiments, the differential 54 is provided with the driven gear 53 thereon, and the output gear 51 becomes the driving gear of the final drive configured to mesh with the driven gear 53 of the final drive, such that the power may be transferred to the two front wheels 210 via the driving gear of the final drive, the driven gear 53 of the final drive and the differential 54 sequentially.

The function of the differential 54 is to properly distribute the power to the two front wheels 210. The differential 54 may be a gear differential, a mandatory locking differential, or the Torsen differential, which may be selected by a person skilled in the art according to different vehicles.

Figure 5:
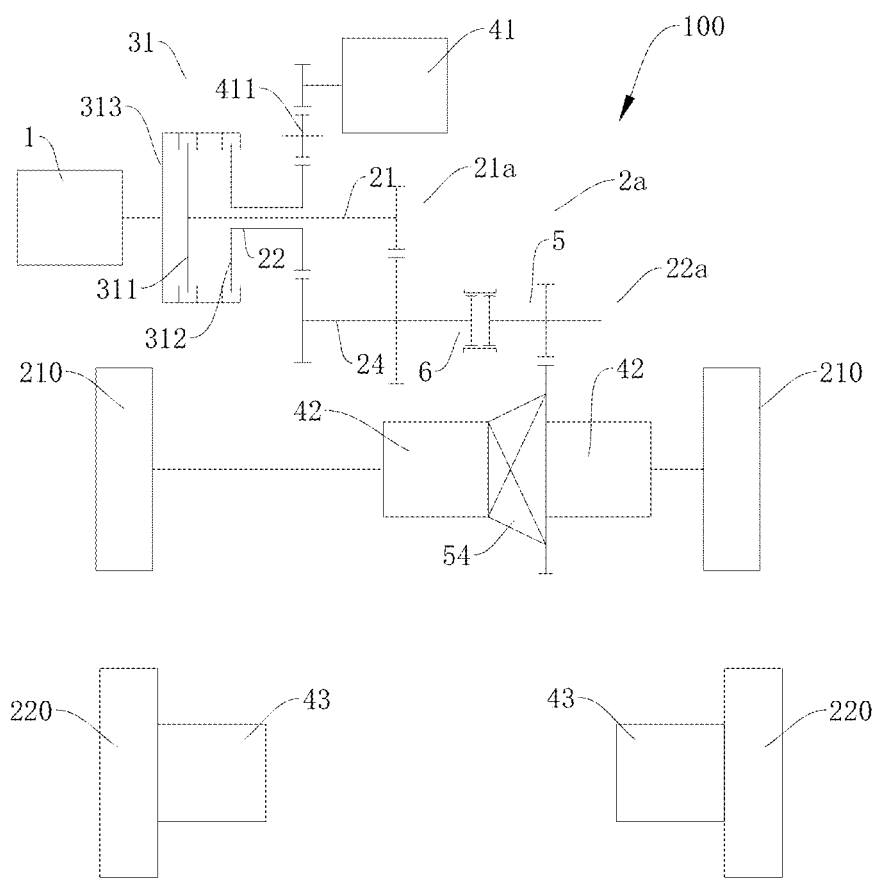
FIG. 5 is a schematic view of a power transmission system according to yet another embodiment of the present disclosure.
Figure 6:
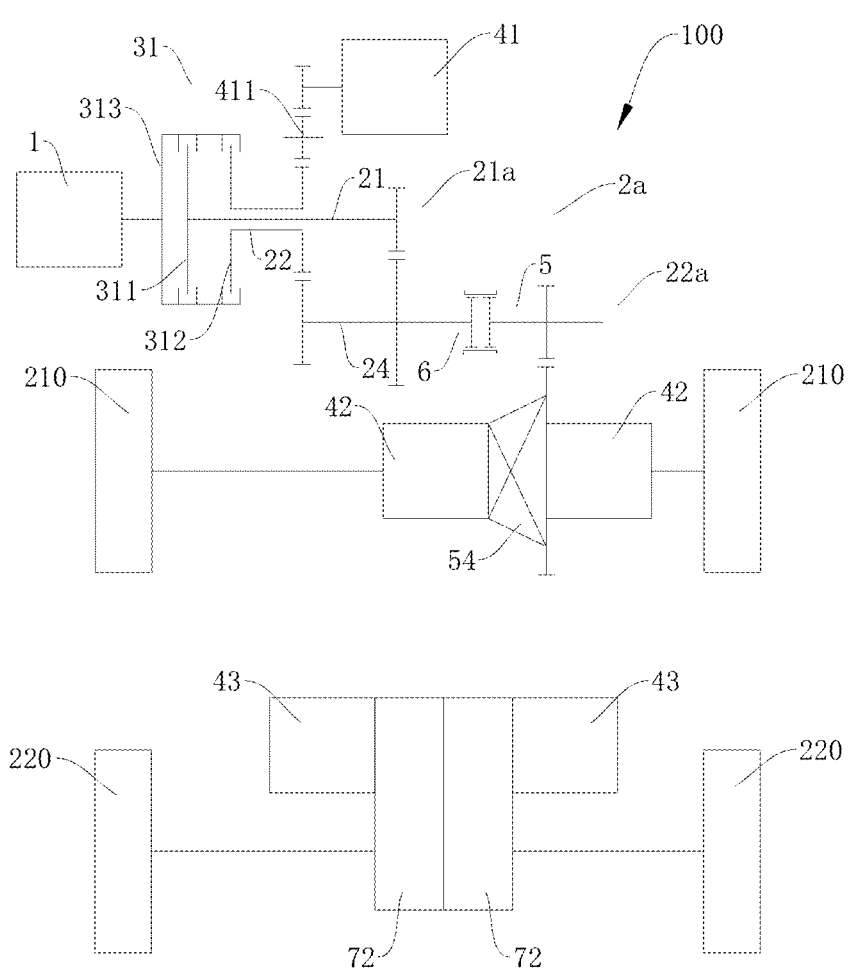
FIG. 6 is a schematic view of a power transmission system according to yet another embodiment of the present disclosure.
Figure 7:
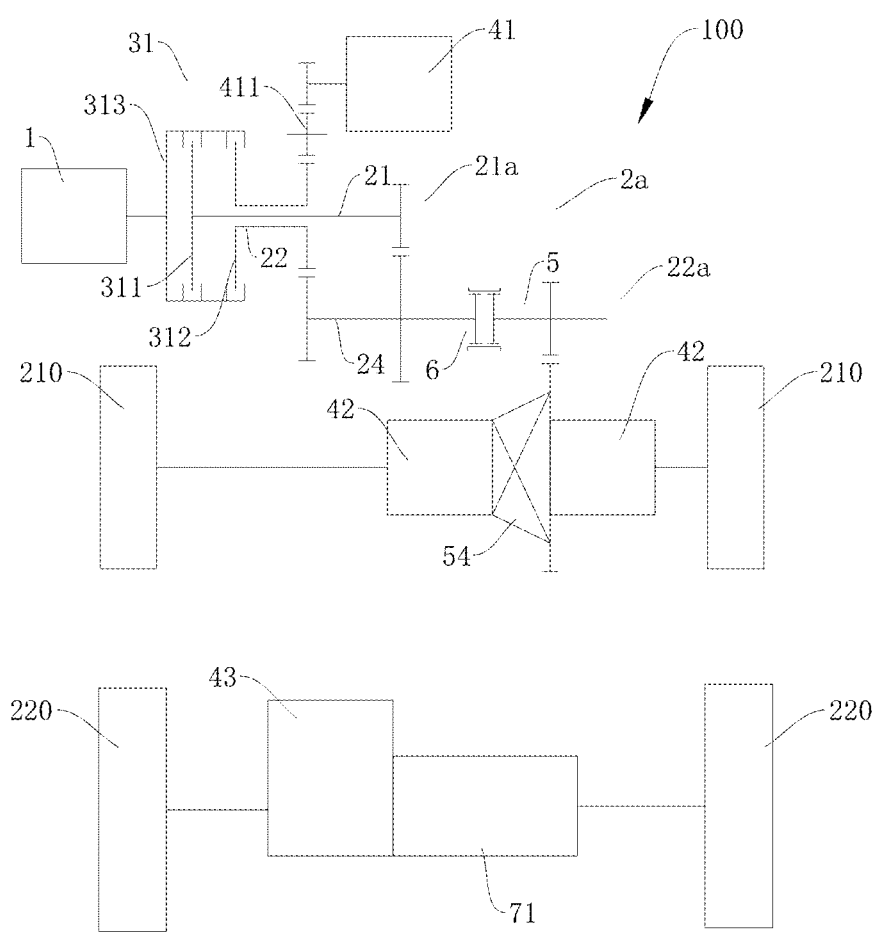
FIG. 7 is a schematic view of a power transmission system according to yet another embodiment of the present disclosure.
Figure 8:
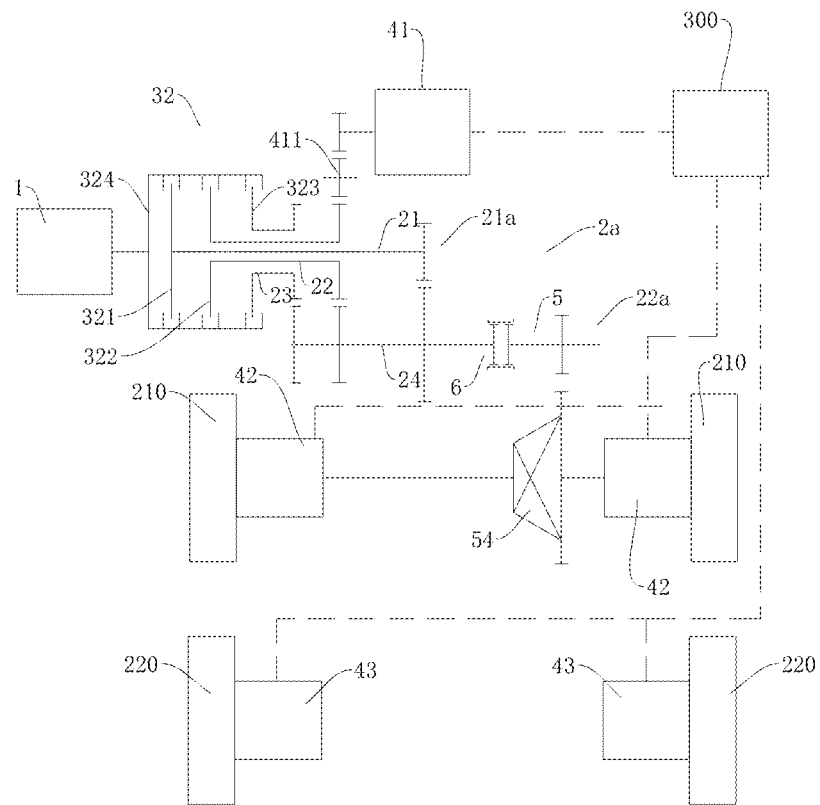
FIG. 8 is a schematic view of a power transmission system according to yet another embodiment of the present disclosure.
Figure 10:
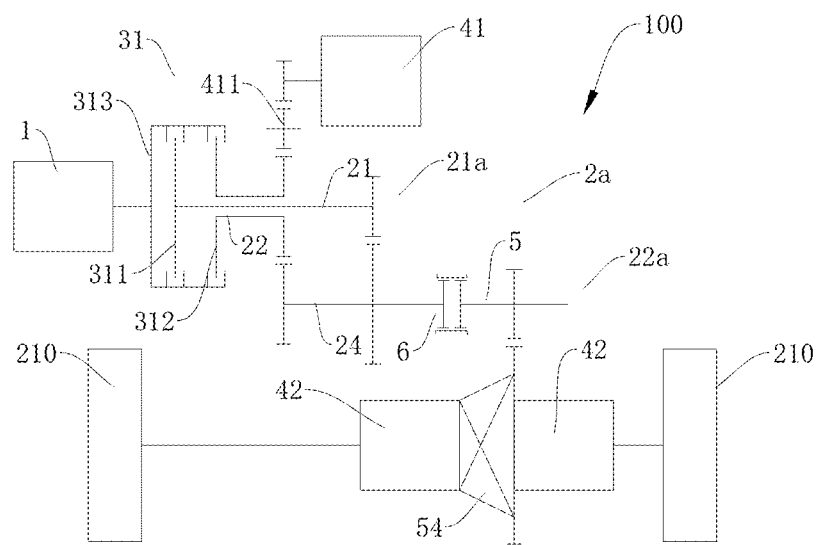
FIG. 10 is a schematic view of a power transmission system according to yet another embodiment of the present disclosure.

In some embodiments of the present disclosure, as shown in FIGS. 5-7 and 10, a pair of second motor generators 42 is disposed on two sides of the differential 54 back to back. For example, a pair of second motor generators 42 is disposed on two sides of the differential 54 and integrally formed with the differential 54. For example, the left second motor generator 42 can be disposed between a left half shaft and the left side of the differential 54, and the right second motor generator 42 can be disposed between a right half shaft and the right side of the differential 54. The power transmission system 100 in FIGS. 5-7 is operable in a four-wheel drive mode, and the power transmission system 100 in FIG. 10 is operable in a two-wheel drive mode. It should be noted that in the following, when referring to "motor generators are disposed on two sides of the differential 54 back to back," it means that the motor generators are disposed on two sides of the differential 54 respectively and integrally formed with the differential 54.

Figure 9:
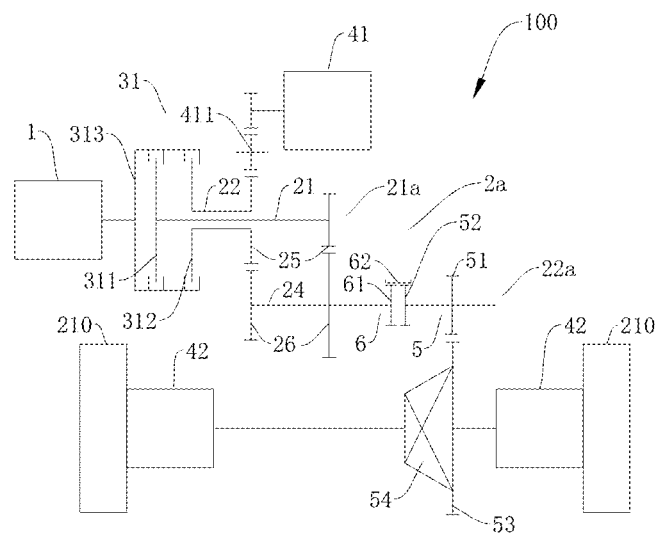
FIG. 9 is a schematic view of a power transmission system according to yet another embodiment of the present disclosure.

In some other embodiments of the present disclosure, as shown in FIGS. 2-4 and 9, the second motor generator 42 is a wheel-side motor. In other words, one of the second motor generators 42 is disposed at an inner side of the left front wheel, and the other of the second motor generators 42 is disposed at an inner side of the right front wheel, and the second motor generator 42 may transfer the power to a hub of a corresponding wheel via a gear mechanism. The power transmission system 100 in FIGS. 2-4 is operable in a four-wheel drive mode, and the power transmission system 100 in FIG. 9 is operable in a two-wheel drive mode.

In some embodiments of the present disclosure, two third motor generators 43 are provided, and the third motor generators 43 are a wheel-side motor, as shown in FIGS. 2 and 5. In other words, in the examples shown in FIGS. 2 and 5, one of the third motor generators 43 is disposed at an inner side of the left rear wheel, the other of the third motor generators 43 is disposed at an inner side of the right rear wheel, and the third motor generator 43 may transfer the power to a corresponding rear wheel via a gear mechanism.

In some other embodiments of the present disclosure, one third motor generator 43 is provided, and the third motor generator 43 drives the second pair of wheels via a first speed changing mechanism 71. The first speed changing mechanism 71 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the second pair of wheels may be connected with each other via an axle which may have an integral structure. The third motor generator 43 may directly drive the integral axle via the first speed changing mechanism 71, to drive the two wheels to rotate synchronously.

In some more embodiments of the present disclosure, two third motor generators 43 are provided, and each third motor generator 43 drives one of the second pair of wheels via a second speed changing mechanism 72. The second speed changing mechanism 72 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the two wheels in the second pair may be connected with the corresponding third motor generators 43 and the corresponding second speed changing mechanisms 72 via two half axles respectively. In other words, one of the third motor generators 43 may drive a corresponding half axle via one of the second speed changing mechanisms 72, so as to drive the wheel at an outer side of the half axle to rotate.

Figure 11:
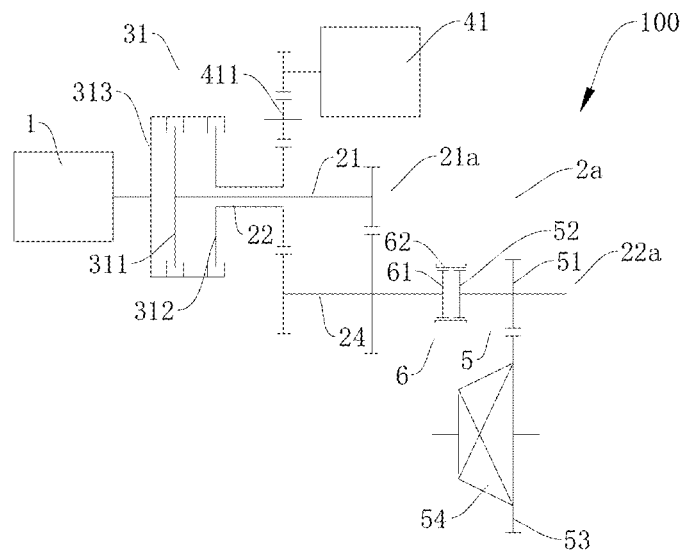
FIG. 11 is a schematic view of a power transmission system according to yet another embodiment of the present disclosure.
Figure 11:
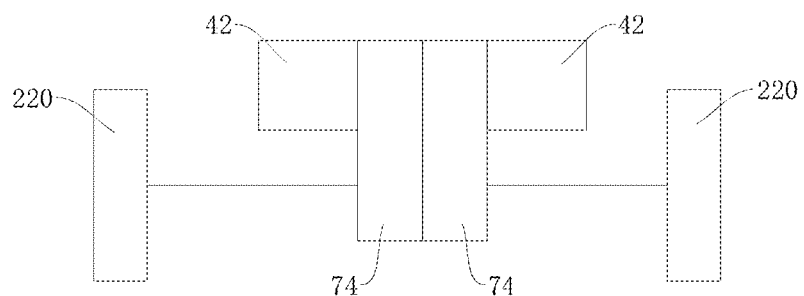
Figure 12:
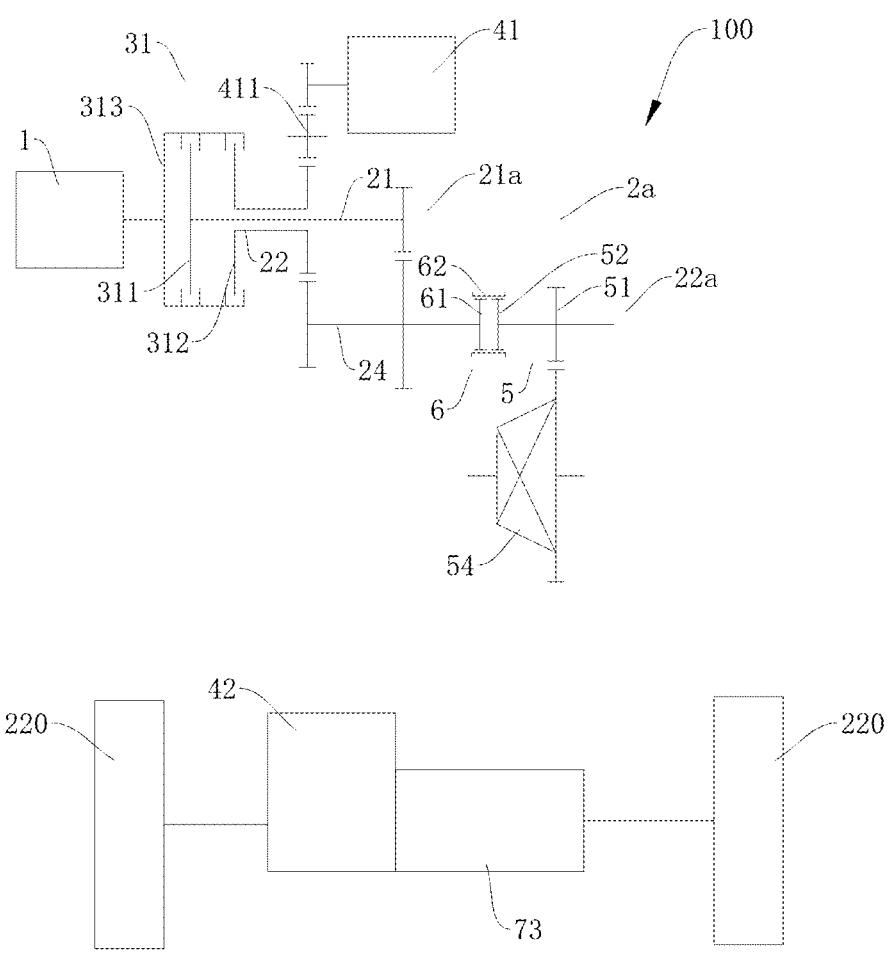
FIG. 12 is a schematic view of a power transmission system according to yet another embodiment of the present disclosure.
Figure 13:
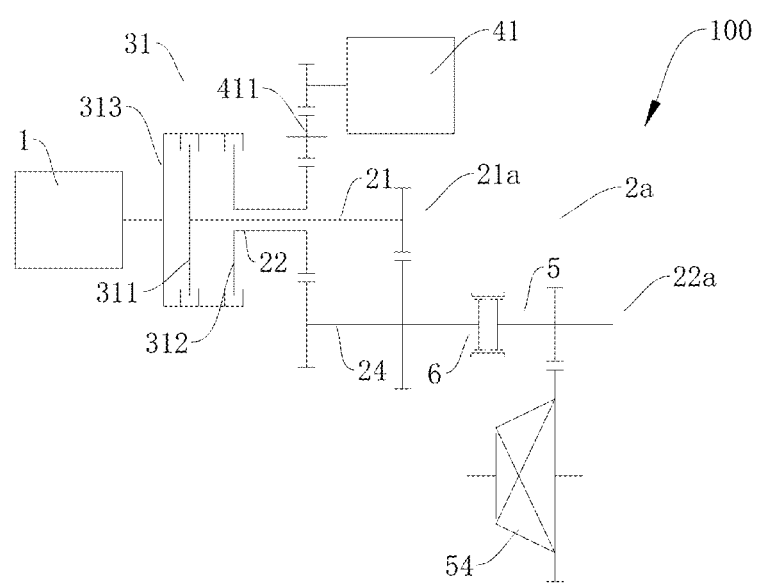
FIG. 13 is a schematic view of a power transmission system according to yet another embodiment of the present disclosure.
Figure 13:
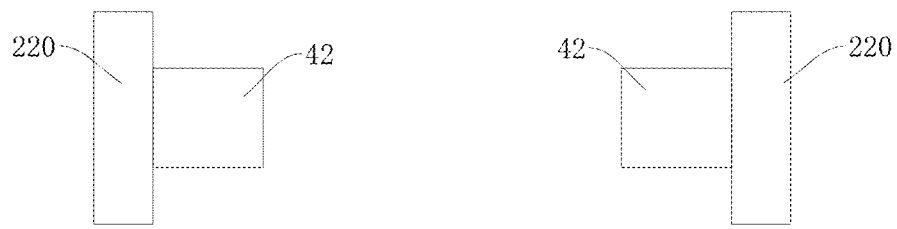

In some other embodiments of the present disclosure, as shown in FIGS. 9-10, the power transmission system 100 is operable in a two-wheel drive mode. In an example shown in FIG. 9, the output unit 5 drives the front wheels 210, and the second motor generator 42 is a wheel-side motor and is configured to drive the front wheels 210. In an example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. As shown in FIGS. 11-13, the power transmission system 100 is operable in a four-wheel drive mode. In an example shown in FIG. 11, the output unit 5 drives the front wheels 210, two second motor generators 42 are provided, and each second motor generator 42 drives one rear wheel 220 via one fourth speed changing mechanism 74. In an example shown in FIG. 12, the output unit 5 drives the front wheels 210, one second motor generator 42 is provided, and the second motor generator 42 drives the rear wheels 220 via one third speed changing mechanism 73. In an example shown in FIG. 13, the output unit 5 drives the front wheels 210, two second motor generators 42 are provided and are wheel-side motors, which are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments of the present disclosure, the power transmission system 100 may also include a battery component 300. The battery component 300 is preferably connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery component 300, and electric energy recovered by the second motor generator 42 and the third motor generator 43 during the braking may also be supplied to and stored in the battery component 300. When the vehicle is operated in an EV mode, the battery component 300 may supply electric energy to at least one of the first motor generator 41, the second motor generator 42 and the third motor generator 43. It would be appreciated that the dot lines shown in FIG. 8 indicate that the battery component 300 may be electrically connected with the first motor generator 41, the second motor generator 42 and the third motor generator 43 respectively.

As an alternative embodiment of the power transmission system 100 described in the foregoing embodiment, as shown in FIG. 8, the power transmission system 100 includes input shafts, which include three shafts, e.g. the first input shaft 21, the second input shaft 22 and the third input shaft 23, with the second input shaft 22 being fitted over the first input shaft 21, and the third input shaft 23 being fitted over the second input shaft 22.

In the alternative embodiment, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

Similarly, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, and 323, or may be disconnected with the first, second and third output terminals 321, 322, and 323. It would be appreciated that the operation principle of the triple clutch 32 is similar to that of the dual clutch 31, so the detailed description thereof will be omitted here.

It should be noted that in the alternative embodiment, other parts such as the power transmitting manner between the first motor generator 41 and the first input shaft 21 or the output shaft 24 as well as the position and drive mode of the second motor generator 42 and the third motor generator 43, are also similar to those described in the technical solutions of the dual clutch 31, so the detailed description thereof will be omitted here.

Figure 14:
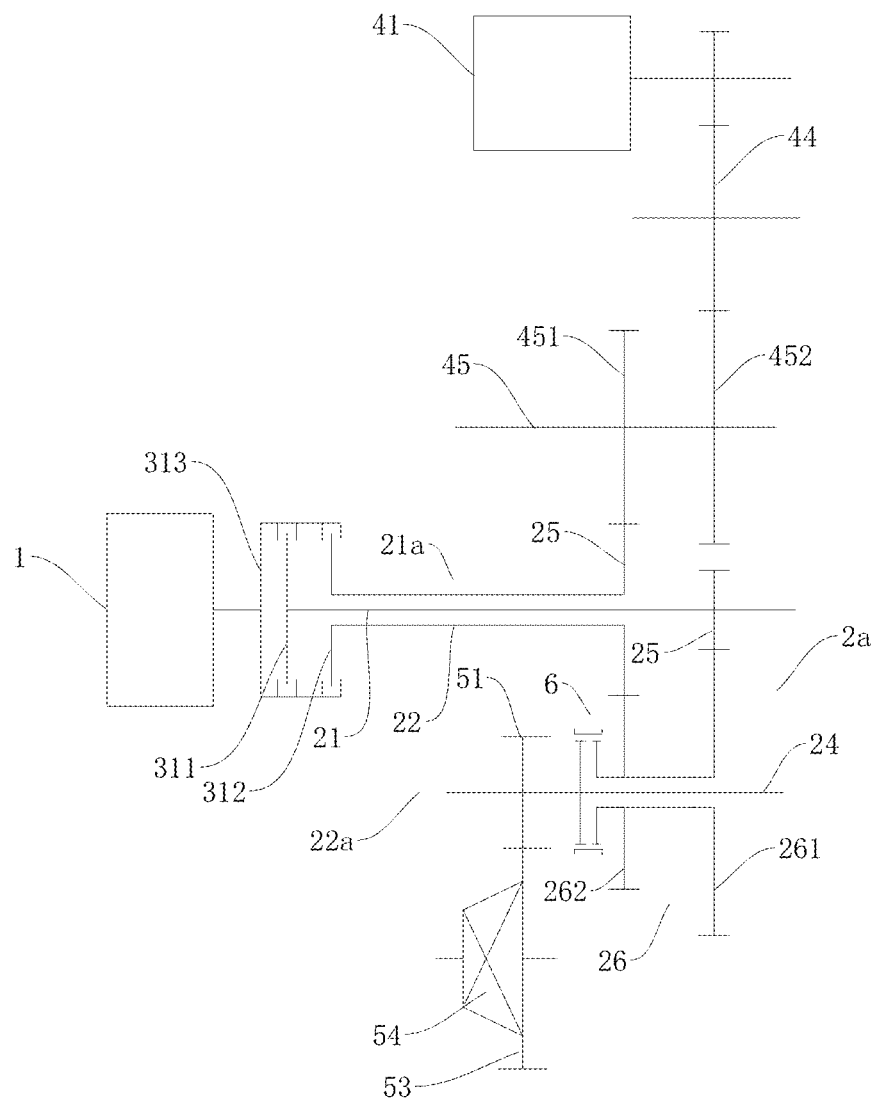
FIG. 14 is a schematic view of a power transmission system according to yet another embodiment of the present disclosure.
Figure 15:
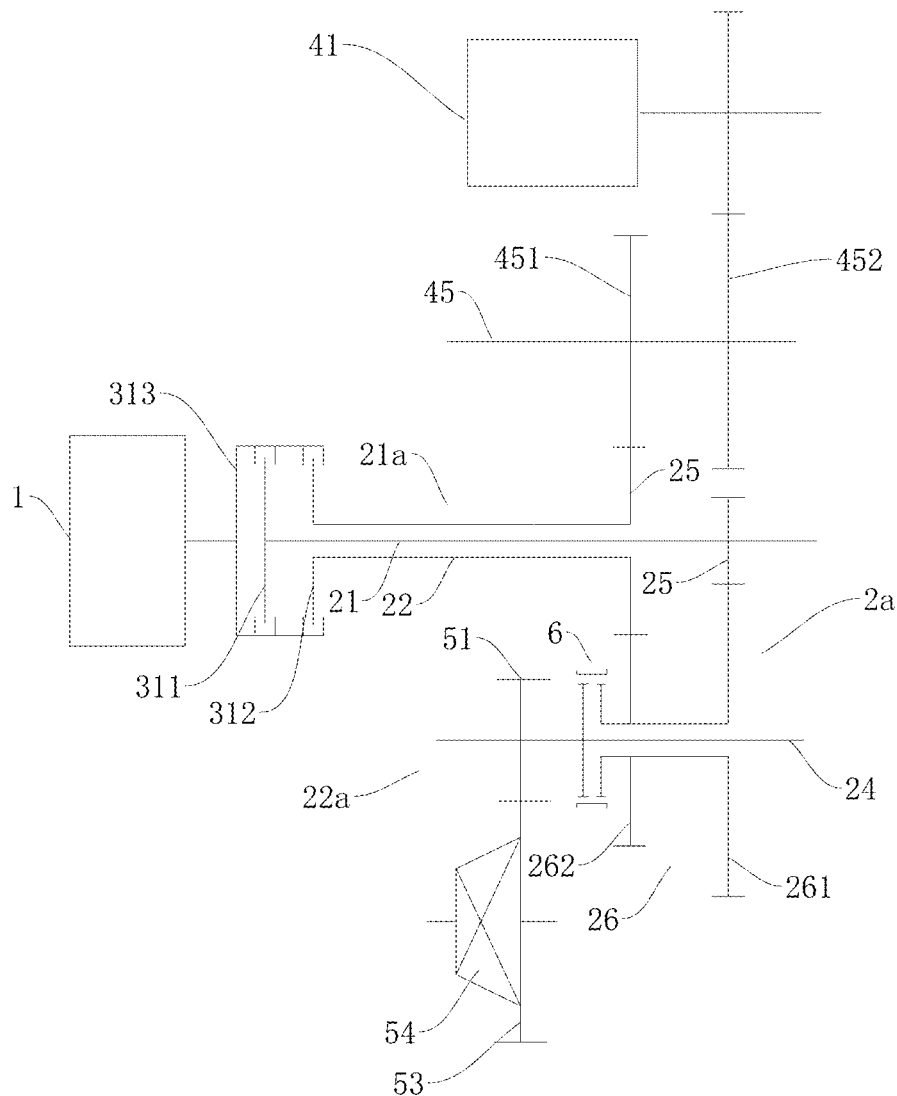
FIG. 15 is a schematic view of a power transmission system according to yet another embodiment of the present disclosure.
Figure 16:
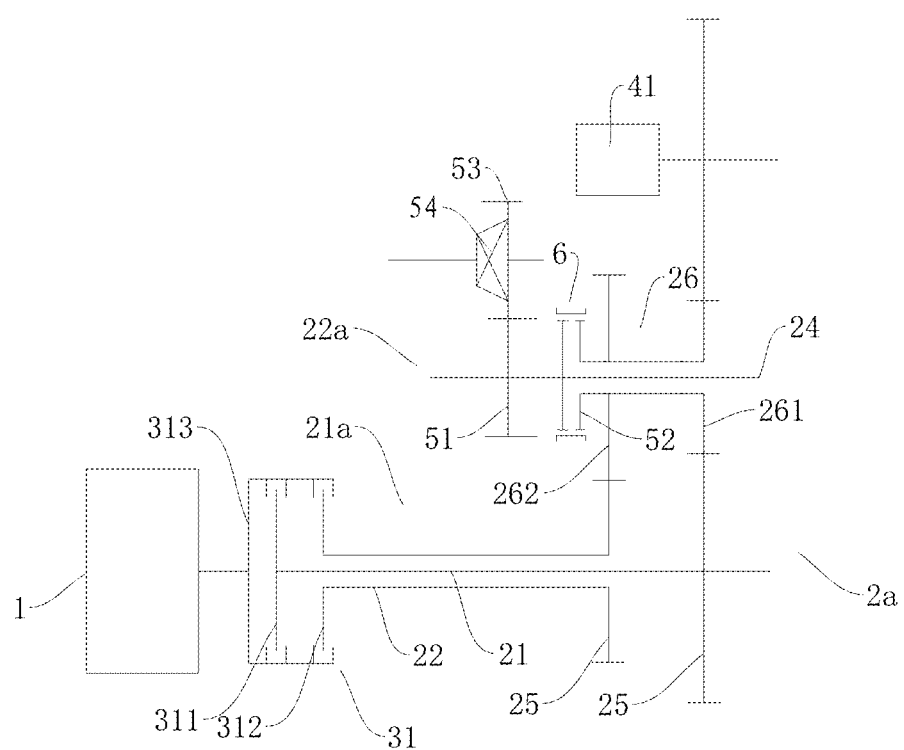
FIG. 16 is a schematic view of a power transmission system according to yet another embodiment of the present disclosure.

As another alternative embodiment of the power transmission system 100 described in the foregoing embodiment, as shown in FIGS. 14-16, the power transmission system 100 includes a driven gear 26 which is configured as a linked gear, and the linked gear structure 26 is freely fitted over the output shaft 24 and rotates differentially relative to the output shaft 24. The synchronizer 6 is disposed on the output shaft 24 and may be selectively engaged with the linked gear structure 26.

In the embodiment, two input shafts are provided, e.g. the first input shaft 21 and the second input shaft 22, and each input shaft is provided with one driving gear 25. The linked gear structure 26 can be a double-linked gear. The double-linked gear structure 26 has a first gear part 261 and a second gear part 262, and the first gear part 261 and the second gear part 262 are configured to mesh with two driving gears 25 respectively.

When the power transmission system 100 in this embodiment transmits the power, the synchronizer 6 may be engaged with the double-linked gear structure 26, such that the power output by at least one of the engine unit 1 and the first motor generator 41 may be output via the output unit 5 and, e.g., the driving gear 51 of the final drive.

In these embodiments, the power transmitting between the first motor generator 41 and the output shaft or one of the output shafts may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will also be omitted here.

In these embodiments, as shown in FIGS. 14-16, the power transmission system 100 may include an engine unit 1, a plurality of input shafts, an output shaft 24, an output unit 5 (e.g., the driving gear 51 of the final drive), a synchronizer 6 and a first motor generator 41.

A main difference of these alternative embodiments from the power transmission system 100 shown in FIGS. 2-13 is that a driven gear 26 which is a linked gear and can be freely fitted over the output shaft 24. With the output unit 5 fixed on the output shaft 24, the synchronizer 6 can be configured to engage with the linked gear. In these embodiments, the arrangement of the first motor generator 41 may slightly differ from that of the first motor generator 41 in the power transmission system 100 shown in FIGS. 2-13.

In some embodiments, as shown in FIGS. 14-16, a plurality of input shafts is provided, the input shafts are provided with the driving gears 25 thereon. The linked gear structure 26 is freely fitted over the output shaft 24. The linked gear structure 26 has a plurality of gear parts (for example, the first gear part 261, and the second gear part 262), and the gear parts are configured to mesh with the driving gears 25 on the input shafts respectively.

As shown in FIGS. 14-16, the output unit 5 is configured to output the power from the output shaft 24. For example, preferably, the output unit 5 is fixed on the output shaft 24. In an embodiment of the present disclosure, by way of example and without limitation, the output unit 5 may include the driving gear 51 of the final drive.

The synchronizer 6 is disposed on the output shaft 24. The synchronizer 6 is configured to selectively engage with the linked gear structure 26, so as to output the power via the output unit 5 to drive the wheels of the vehicle. The power transmission between the first motor generator 41 and one of the input shaft and the output shaft 24 may be direct or indirect.

In these embodiments, the function of the synchronizer 6 is substantially the same as that of the synchronizer 6 shown in FIGS. 2-13. The synchronizer 6 in these embodiments are configured to engage the linked gear structure 26 with the output shaft 24, while the synchronizer 6 shown in the embodiments in FIGS. 2-13 is configured to engage the output unit 5 with the output shaft 24.

In these embodiments, the function of the synchronizer 6 is to eventually synchronize the linked gear structure 26 with the output shaft 24, so that the linked gear structure 26 and the output shaft 24 can operate synchronously to output the power from at least one of the engine unit 1 and the first motor generator 41 with the output unit 5 as a power output terminal. When the linked gear structure 26 and the output shaft 24 are not synchronized by the synchronizer 6, the power from at least one of the engine unit 1 and the first motor generator 41 may not be directly output to the wheels 200 via the output unit 5.

The synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear structure 26 with the rotating speed of the output shaft 24 as a target value, so as to match the speed of the linked gear structure 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear structure 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments of the present disclosure, the input shafts are coaxially nested, and each input shaft is provided with one driving gear 25. In an embodiment, the input shafts include a first input shaft 21 and a second input shaft 22, and each input shaft is provided with one driving gear 25. The linked gear structure 26 is a double-linked gear, the double-linked gear structure 26 has a first gear part 261 and a second gear part 262, and the first gear part 261 and the second gear part 262 are configured to mesh with two driving gears 25 respectively.

A dual clutch 31 may be disposed between the engine unit 1 and the first and second input shafts 21 and 22. For this part, reference may be made to the dual clutch 31 in the power transmission system 100 shown in FIGS. 2 to 13. Optionally, the dual clutch 31 may be provided with a damping structure thereon. For example, the damping structure may be arranged between a first output terminal and an input terminal of the dual clutch 31, to adapt to start the vehicle at a low gear.

As shown in FIGS. 14-16, direct power transmitting and indirect power transmitting between an output terminal of the first motor generator 41 and one driving gear can be performed.

For example, the power transmission system 100 in these embodiments further includes an intermediate shaft 45. A first intermediate shaft gear 451 and a second intermediate shaft gear 452 are fixed on the intermediate shaft 45. One of the first and second intermediate shaft gears 451 and 452 is configured to mesh with one driving gear 25. For example, as shown in FIGS. 14-15, the first intermediate shaft gear 451 is configured to mesh with the driving gear 25 on the second input shaft 22. Of course, the present disclosure is not limited to these examples.

In some embodiments of the present disclosure, direct power transmission between the output terminal of the first motor generator 41 and one of the first and second intermediate shaft gears 451 and 452, or indirect power transmission between the output terminal of the first motor generator 41 and one of the first and second intermediate shaft gears 451 and 452 via an intermediate idler 44, can be performed. For example, as shown in FIG. 14, indirect power transmitting between the output terminal of the first motor generator 41 and the second intermediate shaft gear 452 via an intermediate idler 44 is performed. As another example, as shown in FIG. 15, the output terminal of the first motor generator 41 is configured to directly mesh with the second intermediate shaft gear 452 for power transmission.

As shown in FIG. 16, the output terminal of the first motor generator 41 is configured to directly mesh with one gear part of the linked gear structure 26. For example, the output terminal of the first motor generator 41 can be configured to directly mesh with the first gear part 261 for power transmission.

However, it would be appreciated that, the present disclosure is not limited to this. The position of the first motor generator 41 may be designed according to practical requirements. For example, the position of the first motor generator 41 may be the same as that described above, or may be as shown in FIGS. 2-13, which will not be described in detail here.

As shown in FIGS. 14-15, the first gear part 261 inputs a torque to the engine unit 1 separately, and the second gear part 262 may input a torque to the engine unit 1 and the first motor generator 41 simultaneously.

As shown in FIGS. 14-16, an engagement gear ring 52 is fixed on a side of the linked gear structure 26 facing the synchronizer 6, and the synchronizer 6 is adapted to engage with the engagement gear ring 52, such that the linked gear structure 26 is rigidly fixed with the output shaft 24 to rotate synchronously with the output shaft 24.

Figure 17:
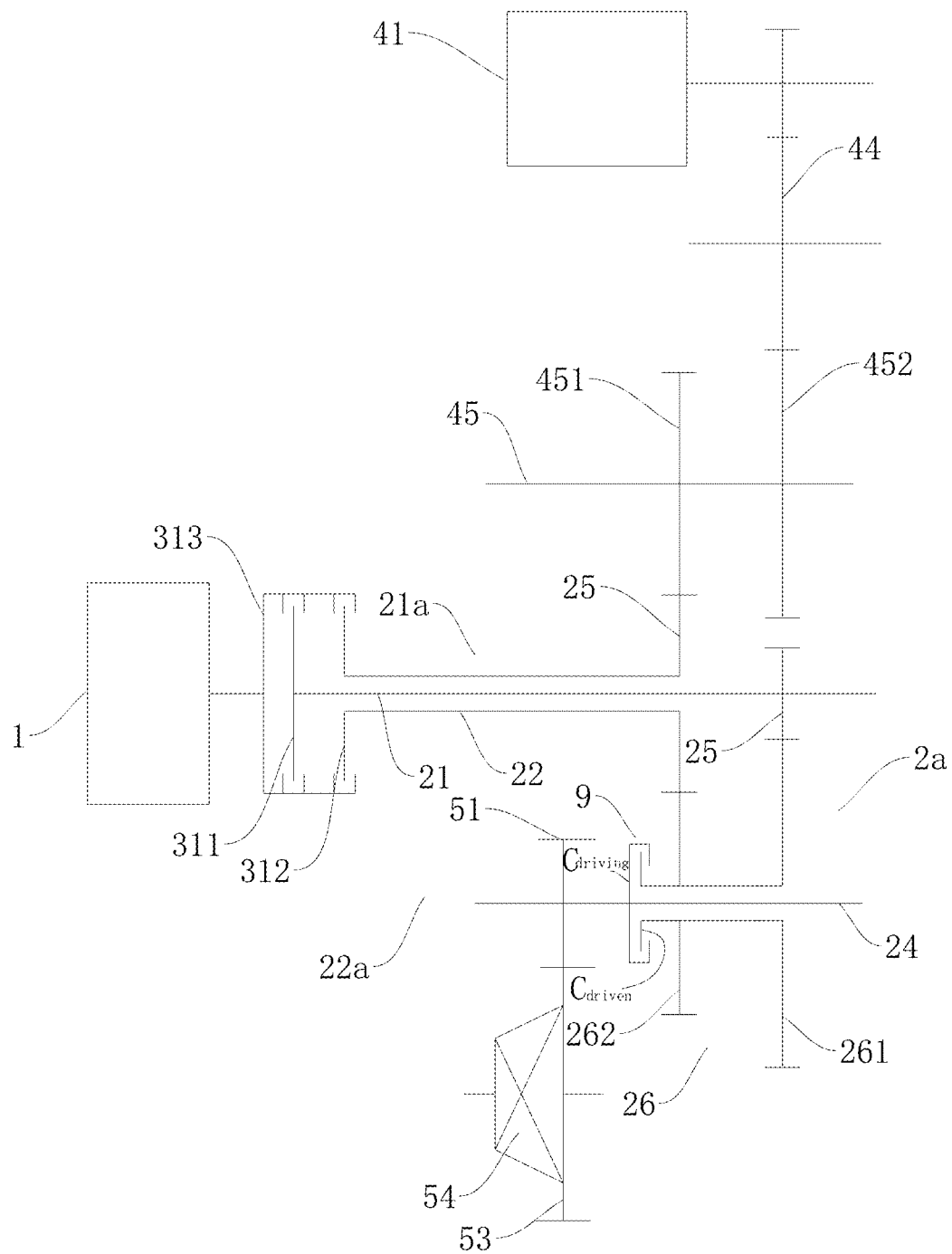
FIG. 17 is a schematic view of a power transmission system according to yet another embodiment of the present disclosure.
Figure 18:
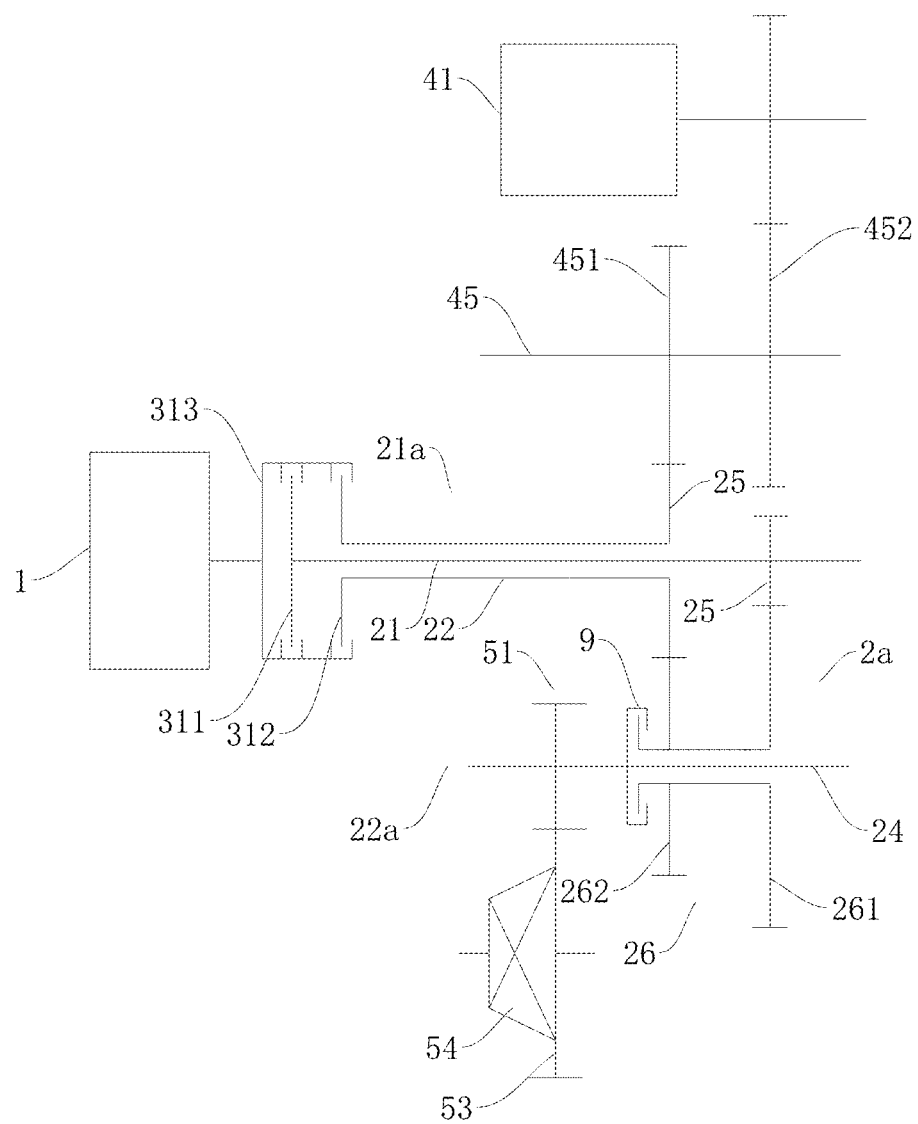
FIG. 18 is a schematic view of a power transmission system according to yet another embodiment of the present disclosure.
Figure 19:
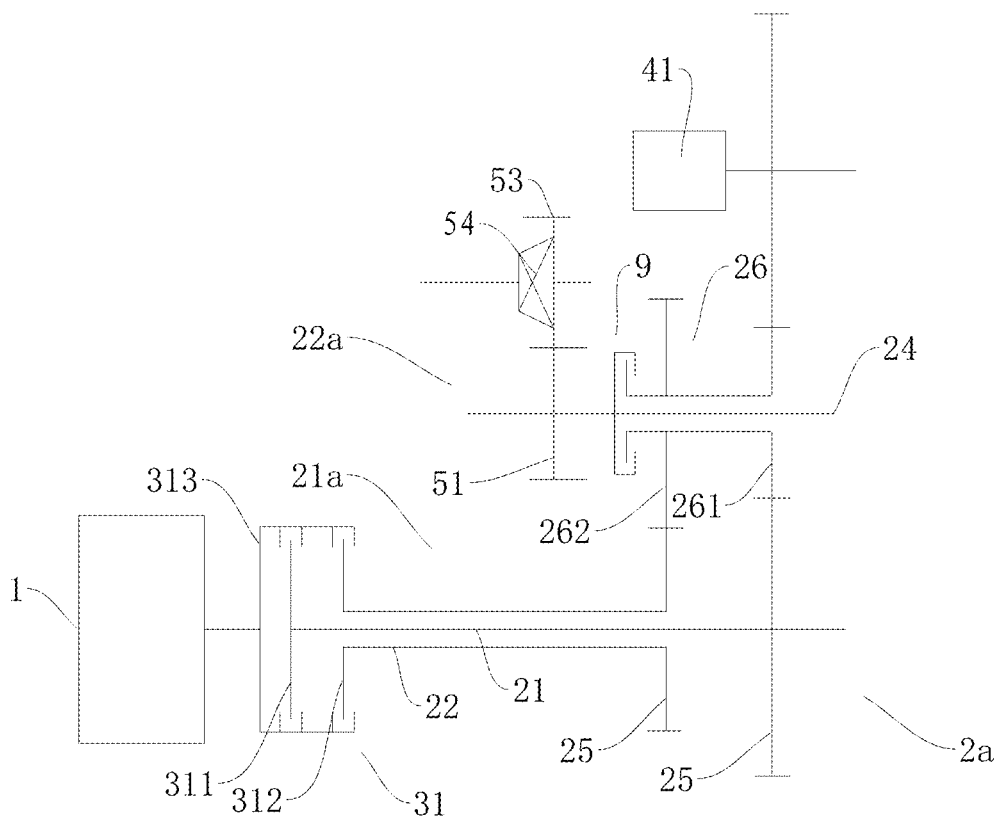
FIG. 19 is a schematic view of a power transmission system according to yet another embodiment of the present disclosure.

In another embodiment of the power transmission system 100 described in the foregoing linked gear embodiment, as shown in FIGS. 17-19, in the power transmission system 100, the synchronizer 6 in the above embodiments can be replaced with a clutch 9.

In these embodiments, as shown in FIGS. 17-19, the power switching device is a clutch 9. The clutch 9 is adapted to enable or interrupt a power transmission between the transmission unit 2a and the output unit 5. In other words, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In these embodiments, the double-linked gear structure 26 is freely fitted over the output shaft 24, and the output unit 5 is fixed on the output shaft 24. The clutch 9 has a driving part ($C_{driving}$ in FIG. 17) and a driven part ($C_{driven}$ in FIG. 17). One of the driving part and the driven part of the clutch 9 is disposed on a linked gear structure such as a double-linked gear 26, and the other of the driving part and the driven part of the clutch 9 is disposed on the output shaft 24. The driving part and the driven part of the clutch 9 may be disengaged from or engaged with each other. For example, as shown in FIG. 17, the driving part may be disposed on the output shaft 24, and the driven part may be disposed on the linked gear structure 26, but the present disclosure is not limited to this.

Therefore, after the driving part and the driven part of the clutch 9 are engaged with each other, the output shaft 24 is engaged with the double-linked gear structure 26 freely fitted over the output shaft 24, so as to output the power via the output unit 5. After the driving part and the driven part of the clutch 9 are disengaged from each other, the linked gear structure 26 is freely fitted over the output shaft 24, and the output unit 5 does not transfer the power from the transmission unit 2a.

Generally speaking, for the power transmission system 100 according to embodiments of the present disclosure, since the synchronizer 6 is used for power switching and has advantages of small volume, simple structure, large torque transmission and high transmission efficiency, the power transmission system 100 according to embodiments of the present disclosure has a reduced volume, a more compact structure and high transmission efficiency, and may meet the large-torque transmission requirements.

Meanwhile, by the speed compensation of at least one of the first motor generator 41, the second motor generator 42 and the third motor generator 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments of the present disclosure, as shown in FIGS. 2-3, 5, 6 and 8, to achieve torque distribution of the wheels, in the five embodiments, four motor generators are used, and each motor generator is configured to drive one wheel. An advantage of four independent motors driving the vehicle lies in that: In the related art, a mechanical four-wheel drive vehicle may only achieve the torque distribution of front and rear wheels, and a full-time four-wheel drive vehicle may only achieve small difference in instantaneous torque of left and right wheels. However, in the foregoing five embodiments, since four motors are used for driving the vehicle, +100% to −100% torque difference adjustment of the left and right wheel motors may be realized, thus greatly enhancing the steering stability during the high-speed turning, and solving the problems of understeer and oversteer. Furthermore, the turning radius of the vehicle may be greatly reduced by the rotation of the left and right wheels in opposite directions when the vehicle runs at a low speed, such that the vehicle is easy to operate.

The structure of the power transmission system 100 in various specific embodiments will be described below with reference to FIGS. 2-19.

Embodiment 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is fixedly provided with one driving gear 25, and indirect power transmission between the first motor generator 41 and the driving gear 25 on the second input shaft 22 is performed via one intermediate gear 411. The output shaft 24 is fixedly provided with two driven gears 26, and the two driven gears 26 are configured to mesh with the driving gears 25 on the first input shaft 21 and the second input shaft 22, to form two gears.

The synchronizer 6 is disposed on the output shaft 24, the driving gear (e.g. the output gear 51) of the final drive may rotate differentially relative to the output shaft 24, while the engagement gear ring 52 adapted to the synchronizer 6 is fixed on a left side of the driving gear of the final drive by using a connecting rod. The driving gear of the final drive is configured to externally mesh with the driven gear 53 of the final drive, and the driven gear 53 of the final drive may be fixed on the differential 54, to transfer the power to the differential 54. The differential 54 distributes the power and adaptively transfers the distributed power to half axles on two sides of the vehicle, to drive the wheels 200.

Two second motor generators 42 constitute wheel-side motors configured to drive two front wheels 210 respectively, and two third motor generators 43 constitute wheel-side motors configured to drive two rear wheels 220 respectively. That is, in the solution, each of the four wheels is provided with one wheel-side motor.

With the power transmission system 100 in this embodiment, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the final drive and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two third motor generators 43 are wheel-side motors, and may directly drive two rear wheels 220 respectively.

The power transmission system 100 in this embodiment may have at least the following operating conditions: a pure electric vehicle (EV) operating condition of the third motor generator 43, a pure EV four-wheel drive operating condition, a parallel operating condition, a series operating condition, and a braking/decelerating feedback operating condition.

First Operating Condition

This operating condition is a pure EV operating condition of the third motor generator 43. The dual clutch 31 is in a disengaged state, the synchronizer 6 is in a disengaged state, the engine unit 1, the first motor generator 41 and the second motor generator 42 do not operate, and two third motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the third motor generators 43 directly drive the rear wheels 220, compared to a front-wheel drive vehicle, the vehicle in this embodiment has better acceleration performance, gradeability and steering capability. Moreover, since the third motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two third motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and two third motor generators 43 drive four wheels independently, the wheels may obtain different torques and rotating speeds, to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the final drive via the shift gear set and the synchronizer 6, and the driving gear 51 of the final drive transfers the power to the front wheels 210 via the differential 54, while two second motor generators 42 transfer the power to the corresponding front wheels 210 and two third motor generators 43 transfer the power to the corresponding rear wheels 220. This operating condition is mainly applicable to a situation where a load is the largest, for example, during quick acceleration, or climbing steep slopes.

This operating condition has the advantages that the five motor generators and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the third motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the third motor generators 43 are configured to drive the rear wheels 220 respectively. This operating condition is mainly applicable to a situation where a load is medium and an electric quantity of a battery is small.

This operating condition has the advantages that, when compared to a front-wheel drive vehicle and a rear-wheel drive vehicle, the vehicle under the series (e.g. four-wheel drive series) operating condition has better acceleration performance, gradeability, handling performance and off-road capability. Since two second motor generators 42 and two third motor generators 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the third motor generators 43 brake the rear wheels 220 and generate electricity. This operating condition is mainly used for braking or decelerating the vehicle.

This operating condition has the advantages that, since the second motor generator 42 and the third motor generator 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the final drive via the shift gear set and the synchronizer 6, the second motor generators 42 drive the front wheels 210 directly via the driving gear 51 of the final drive, and the third motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic performance of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system 100 may switch from the fourth operating condition to the third operating condition. At this time, the first motor generator 41 may adjust the rotating speed of the output shaft 24 with the rotating speed of the driving gear of the final drive as a target value through the rotating speed control, so as to match the rotating speed of the output shaft 24 with the rotating speed of the driving gear of the final drive as far as possible, thus facilitating the engagement of the synchronizer 6.

During the matching, the second motor generators 42 and the third motor generators 43 may respond to the needs of the driver to increase the torque, such that the vehicle is accelerated, unlike a vehicle in the related art, the vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the accelerator demand or the brake pedal operation of the driver, the power transmission system 100 may switch from the fourth operating condition to the fifth operating condition. The second motor generators 42 and the third motor generators 43 may meet the braking feedback requirements, and the feedback of the first motor generator 41 is not needed. At this time, the second motor generators 42 and the third motor generators 43 may instantly respond to the needs of the driver to brake the wheels and feedback the electric quantity, which need not be like a vehicle in the related art which feeds back the electric quantity only when the synchronizer 6 is in an engaged state.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the final drive along with the speed of the vehicle may not be controllable, the speed adjusting accuracy and rate of the first motor generator 41 may be reduced. Under such road conditions, since the second motor generators 42 and the third motor generators 43 may compensate for the torque of the vehicle, the speed of the vehicle may be stabilized effectively, thus improving the driving experience of the vehicle and simplifying the engagement of the synchronizer 6.

Embodiment 2

As shown in FIG. 3, the power transmission system 100 in this embodiment differs from the power transmission system 100 shown in FIG. 2 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that the power transfer between the third motor generators 43 and the corresponding rear wheels 220 is performed via the second speed changing mechanism 72, which will not be detailed here.

Embodiment 3

As shown in FIG. 4, the power transmission system 100 in this embodiment differs from the power transmission system 100 shown in FIG. 2 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 4

As shown in FIG. 5, the power transmission system 100 in this embodiment differs from the power transmission system 100 shown in FIG. 2 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 5

As shown in FIG. 6, the power transmission system 100 in this embodiment differs from the power transmission system 100 shown in FIG. 5 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 6

As shown in FIG. 7, the power transmission system 100 in this embodiment differs from the power transmission system 100 shown in FIG. 5 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 5, so the detailed description thereof will be omitted here. The specific operating conditions of the power transmission system 100 in this embodiment are substantially the same as those of the power transmission system 100 in the embodiment shown in FIG. 5, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 7

As shown in FIG. 8, the power transmission system 100 in this embodiment differs from the power transmission system 100 shown in FIG. 2 in the type of the clutch as well as the number of the input shafts, the driving gears 25 and the driven gears 26. In this embodiment, the clutch is a triple clutch 32, three input shafts are provided, and correspondingly three pairs of driving gears 25 and driven gears 26 are provided. Other parts in this embodiment are substantially the same as those in the power transmission system 100 in the embodiment shown in FIG. 2, so the detailed description thereof will be omitted here.

Embodiment 8

As shown in FIG. 9, the power transmission system 100 in this embodiment differs from the power transmission system 100 shown in FIG. 2 in that the third motor generators 43 in the embodiment shown in FIG. 2 are eliminated, and the power transmission system 100 in this embodiment is operable in a two-wheel drive mode.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components are the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the final drive via the shift gear set and the synchronizer 6, and the driving gear 51 of the final drive evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the final drive via the shift gear set and the synchronizer 6, the driving gear 51 of the final drive evenly distributes the power to the left and right front wheels via the differential 54, and the second motor generators 42 directly drive the left and right front wheels. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the wheels. This operating condition is mainly applicable to a situation where a load is medium and an electric quantity of a battery is small.

This operating condition has the advantages that, since the second motor generators 42 directly drive the wheels, the transmission chain is the shortest, and operating components are the fewest, thus achieving maximum transmission efficiency and minimum noise.

Meanwhile, the first motor generator 41 may keep the engine unit 1 running in an optimal economic region through torque and rotating speed adjustment, thus reducing fuel consumption during the electricity generation. Moreover, since the second motor generators 42 independently drive the left front wheel and the right front wheel respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, and the second motor generator 42 directly brakes the wheels and generates electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system may switch from the fourth operating condition to the third operating condition. At this time, the first motor generator 41 may adjust the rotating speed of the output shaft 24 with the rotating speed of the driving gear 51 of the final drive as a target value through the rotating speed control, so as to match the rotating speed of the output shaft 24 with the rotating speed of the driving gear 51 of the final drive as far as possible, thus facilitating the engagement of the synchronizer 6. During the matching, the second motor generators 42 may respond to the needs of the driver to increase the torque, such that the vehicle is accelerated, unlike a vehicle in the related art, the vehicle does not require the synchronizer 6 to be in an engaged state in order to be accelerated. The torque compensation in advance may greatly shorten the torque response time and improve the instantaneous acceleration performance of the vehicle.

For example, the switching from the fourth operating condition to the fifth operating condition will be described as follows. When the vehicle needs to be braked or decelerated, according to the accelerator demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may instantly respond to the needs of the driver to brake the wheels and feedback the electric quantity, unlike a vehicle in the related art, the vehicle does not require the synchronizer 6 to be in an engaged state to feedback the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 is difficult due to the changing speed of the vehicle. Even if the first motor generator 41 may adjust the rotating speed of the output shaft 24 through the rotating speed control, since the rotating speed of the driving gear of the final drive along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

Embodiment 9

As shown in FIG. 10, the power transmission system 100 in this embodiment differs from the power transmission system 100 shown in FIG. 9 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 9, so the detailed description thereof will be omitted here.

Embodiment 10

As shown in FIG. 11, the power transmission system 100 in this embodiment differs from the power transmission system 100 shown in FIG. 9 in the arrangement of the second motor generators 42. In this embodiment, two second motor generators 42 are provided, and each second motor generator 42 drives a corresponding rear wheel 220 via one fourth speed changing mechanism 74. Other parts in this embodiment are substantially the same as those in the power transmission system 100 in the embodiment shown in FIG. 9, so the detailed description thereof will be omitted here.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels, compared to a front-wheel drive vehicle, the vehicle in this embodiment has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the gear set and the front wheels is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in an engaged state, the engine unit 1 does not operate, the first motor generator 41 drives the front wheels respectively, and the second motor generators 42 drive the rear wheels respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Third Operating Condition

This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels respectively. This operating condition is mainly applicable to a situation where a load is the largest, for example, during quick acceleration, or climbing steep slopes. This operating condition has the advantages that two motor generators and the engine unit drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels respectively. This operating condition is mainly applicable to a situation where a load is medium and an electric quantity of a battery is small. This operating condition has the advantages that, since the two second motor generators independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in a disengaged state, the synchronizer 6 is in an engaged state, the engine unit does not operate, and the first motor generator and the second motor generators brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators may control the braking force independently, thus improving the handling stability of the vehicle during braking when turning, and further increasing the feedback energy.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 11

As shown in FIG. 12, the power transmission system 100 in this embodiment differs from the power transmission system 100 shown in FIG. 9 in the arrangement of the second motor generators 42. In this embodiment, one second motor generators 42 is provided, and the second motor generator 42 drives the rear wheels 220 via one third speed changing mechanism 73. Other parts in this embodiment are substantially the same as those in the power transmission system 100 in the embodiment shown in FIG. 9, so the detailed description thereof will be omitted here.

In this embodiment, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this embodiment has better acceleration performance, gradeability and steering capability. In a front-wheel drive part, the synchronizer 6 is in a disengaged state, so there is no mechanical loss in the front-wheel drive part, thus reducing the energy consumption of the vehicle. In a rear-wheel drive part, a differential integrally formed with the third speed changing mechanism 73 may also be added.

In this embodiment, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drives the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has better dynamic performance than a single-motor drive, and has better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this embodiment, the power transmission system may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drives the rear wheels 220. This operating condition is mainly applicable to a situation where a load is the largest, for example, during quick acceleration, or climbing steep slopes. This operating condition has the advantages that two motors and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability.

In this embodiment, the power transmission system may also have a series operating condition. The dual clutch 31 is in an engaged state, the synchronizer 6 is in a disengaged state, the engine unit 1 drives the first motor generator 41 to generate electricity, and the second motor generator drives the rear wheels. This operating condition is mainly applicable to a situation where a load is medium and an electric quantity of a battery is small. This operating condition has the advantages that the second motor generator 42 drives the rear wheels, and compared to a front-wheel drive vehicle, the vehicle under the series operating condition has better acceleration performance, gradeability and steering capability. Moreover, the first motor generator 41 may keep the engine unit 1 running in an optimal economic region through torque and rotating speed adjustment, thus reducing fuel consumption during the electricity generation.

In this embodiment, the power transmission system may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch 31, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 12

As shown in FIG. 13, the power transmission system 100 in this embodiment differs from the power transmission system 100 shown in FIG. 9 in the arrangement of the second motor generators 42. In this embodiment, two second motor generators 42 are provided and are wheel-side motors, and each second motor generator 42 drives a corresponding rear wheel 220. Other parts in this embodiment are substantially the same as those in the power transmission system 100 in the embodiment shown in FIG. 9, so the detailed description thereof will be omitted here.

Embodiment 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. Indirect power transmitting between the output terminal of the first motor generator 41 and the second intermediate shaft gear 452 via an intermediate idler 44 is performed.

The synchronizer 6 is disposed on the output shaft 24 and configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. The output terminal of the first motor generator 41 is configured to directly mesh with the second intermediate shaft gear 452 for power transmitting.

The synchronizer 6 is disposed on the output shaft 24 and is configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22. The output terminal of the first motor generator 41 is configured to directly mesh with the first gear part 261 for power transmitting.

The synchronizer 6 is disposed on the output shaft 24 and configured to engage with the double-linked gear 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 16

As shown in FIG. 17, the power transmission system 100 in this embodiment differs from the power transmission system 100 shown in FIG. 14 in that the clutch 9 is provided instead of the synchronizer 6 of the power transmission system 100 in FIG. 14, and the driving gear 51 of the final drive is fixed on the output shaft 24.

Embodiment 17

As shown in FIG. 18, the power transmission system 100 in this embodiment differs from the power transmission system 100 shown in FIG. 15 in that the clutch 9 is provided instead of the synchronizer 6 of the power transmission system 100 in FIG. 15, and the driving gear 51 of the final drive is fixed on the output shaft 24.

Embodiment 18

As shown in FIG. 19, the power transmission system 100 in this embodiment differs from the power transmission system 100 shown in FIG. 16 in that the clutch 9 is provided instead of the synchronizer 6 of the power transmission system 100 in FIG. 16, and the driving gear 51 of the final drive is fixed on the output shaft 24.

It should be noted that, as shown in FIGS. 14-19, in an alternative embodiment of the linked gear structure 26, the power transmission system 100 may further include the second motor generator 42 and the third motor generator 43 or only include the third motor generator 43 (not shown in FIGS. 14-19), and the arrangement of the second motor generator 42 and the third motor generator 43 may be the same as that in FIGS. 2-13, for example, being in a wheel-side form, or being disposed at two sides of the differential back to back. For example, as an optional embodiment, the driving gear 51 of the final drive of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

In addition, embodiments of the present disclosure further provide a vehicle including the abovementioned power transmission system 100. It would be appreciated that, other components (e.g., a driving system, a steering system, and a braking system) of the vehicle according to embodiments of the present disclosure are well known to those skilled in the art, so the detailed description thereof will be omitted here.

Based on the power transmission system and the vehicle having the power transmission system that are described in the above embodiments, embodiments of the present disclosure provide a vehicle and a coasting feedback control method for the same, where the coasting feedback control method for a vehicle In some embodiments of the present disclosure is executed based on the power transmission system and the vehicle having the power transmission system that are described in the above embodiments.

Next, the vehicle and the coasting feedback control method for the same according to embodiments of the present disclosure are described with reference to the accompanying drawings.

Figure 20:
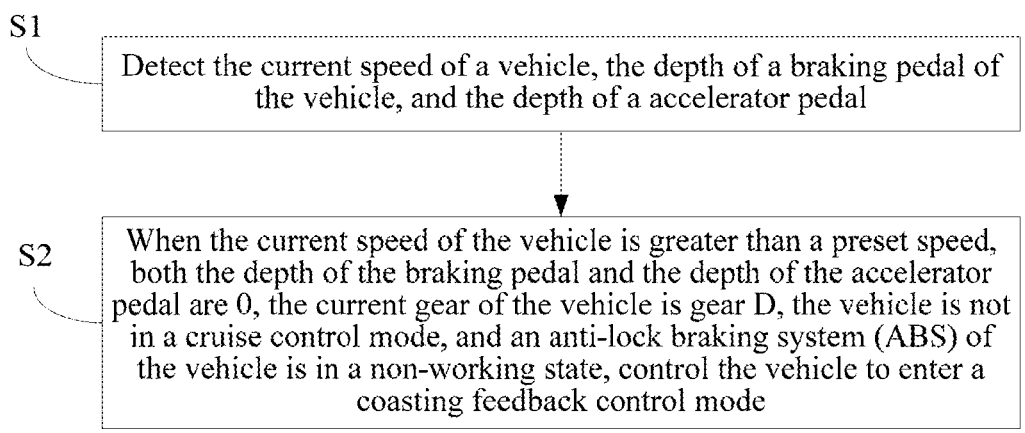
FIG. 20 is a flowchart of a braking feedback control method for a vehicle according to an embodiment of the present disclosure.

FIG. 20 is a flowchart of a coasting feedback control method for a vehicle according to an embodiment of the present disclosure. The vehicle In some embodiments of the present disclosure includes the power transmission system described in the foregoing embodiments, that is, the vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive at least one of front and rear wheels of the vehicle, and a power battery for supplying power to the first motor generator and the second motor generator, where the output unit is configured to transmit the power transmitted by the transmission unit to at least one of front and rear wheels of the vehicle, and the power switching device is adapted to enable or interrupt power transmission between the transmission unit and the output unit.

As shown in FIG. 20, the coasting feedback control method for a vehicle In some embodiments of the present disclosure includes the following steps:

S1: Detect the current speed of the vehicle, the depth of a braking pedal of the vehicle, and the depth of an accelerator pedal.

S2: When the current speed of the vehicle is greater than a preset speed, both the depth of the braking pedal and the depth of the accelerator pedal are 0, the current gear of the vehicle is gear D, the vehicle is not in a cruise control mode, and an anti-lock braking system (ABS) of the vehicle is in a non-working state, control the vehicle to enter a coasting feedback control mode, where when the vehicle is in the coasting feedback control mode, a coasting feedback torque of the first motor generator and a coasting feedback torque of the second motor generator are distributed according to a selected coasting feedback torque curve of the vehicle.

Figure 21:
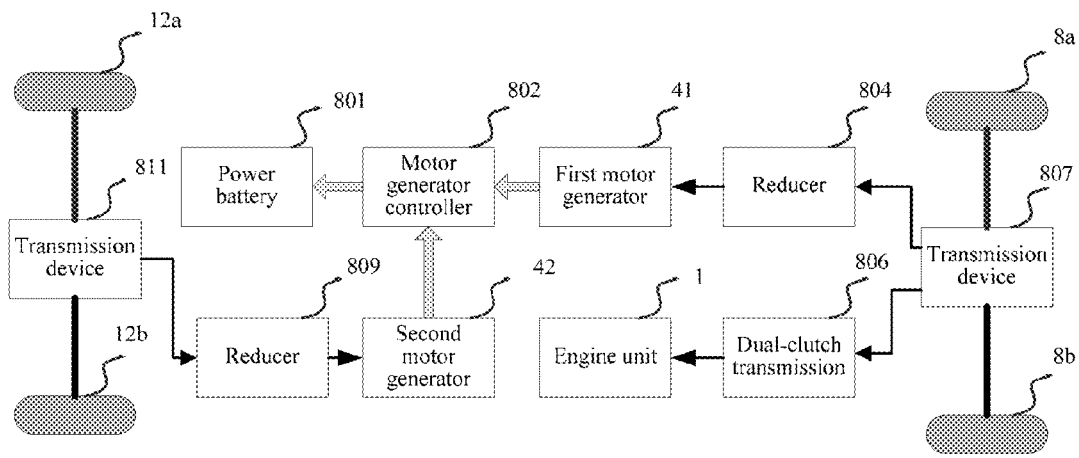
FIG. 21 is a block diagram of an energy flow of coasting feedback control when an accelerator pedal of a series-parallel energy-efficient four-wheel drive vehicle is released according to an embodiment of the present disclosure.

FIG. 21 is a block diagram of an energy flow of coasting feedback control when an accelerator pedal of a series-parallel energy-efficient four-wheel drive vehicle is released according to an embodiment of the present disclosure. As shown in FIG. 21, an electric energy storage unit power battery 801 is connected to a motor generator controller 802 by using a direct-current bus, the motor generator controller 802 connects the first motor generator 41 and the second motor generator 42 by using an alternate-current three-phase cable, the first motor generator 41 is connected to a transmission device 807 by using a reducer 804, the engine unit 1 is connected to the transmission device 807 by using a dual-clutch transmission 806, and electric power and fuel power are coupled at the transmission device 807 and are transferred to wheels 8a, 8b (e.g., the front wheels). The second motor generator 42 is connected to a transmission device 811 via a reducer 809, and the electric power is transferred to the wheels 12a, 12b (e.g., the rear wheels) via the transmission device 811.

When the series-parallel energy-efficient four-wheel drive vehicle is coasting with the accelerator pedal released, in a hybrid electric vehicle (HEV) operation mode, most of the energy is transferred from the wheels 12a, 12b to the transmission device 811, and is then transferred from the transmission device 811 to the reducer 809. By means of the electricity generation function of the second motor generator 42, the mechanical energy is converted into electric energy, which is transferred to the motor generator controller 802, and the motor generator controller 802 then performs rectification on three-phase alternate-current electricity into suitable direct-current electricity and charges the direct-current electricity into the power battery 801. A frictional force is provided to the wheels 12a, 12b at the same time, to achieve the objective of deceleration of the vehicle. Only a small amount of energy is transferred from the wheels 8a, 8b to the transmission device 807, the transmission device 807 then transfers the energy to the reducer 804 and the dual-clutch transmission 806 respectively, and the dual-clutch transmission 806 then transfers the energy to the engine unit 1, so as to maintain normal operation of the engine unit 1. A part of energy from the reducer 804 is converted from mechanical energy into electric energy by means of an electricity generation function of the first motor generator 41, the electric energy is transferred to the motor generator controller 802, the motor generator controller 802 then performs rectification on the three-phase alternate-current electricity to obtain suitable direct-current electricity, and charges the direct-current electricity into the power battery 1. At the same time, a frictional force is provided to the wheels 8a, 8b, to achieve the objective of facilitating deceleration of the vehicle.

If the vehicle is in the pure EV operation mode, most of the energy is transferred via a channel, that is, a channel from the transmission device 811 to the reducer 809, and a small amount of energy is transferred via a channel, that is, a channel from the transmission device 807 to the reducer 804, and the engine unit 1 is not involved.

Figure 22:
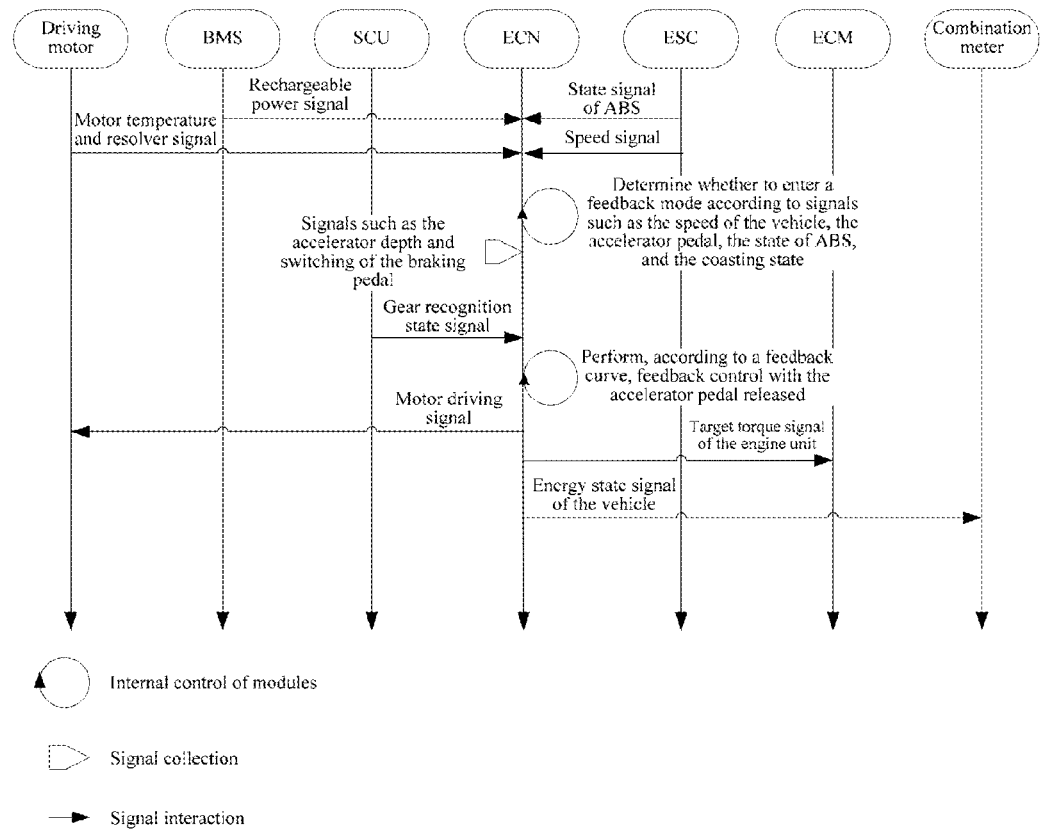
FIG. 22 is a diagram of information interaction of coasting feedback control when an accelerator pedal of a vehicle is released according to an embodiment of the present disclosure.

FIG. 22 is a diagram of information interaction of coasting feedback control when an accelerator pedal of a vehicle is released according to an embodiment of the present disclosure. As shown in FIG. 22, the driving motor collects a motor resolver signal and a temperature signal by using sensors and transfers the motor resolver signal and the temperature signal to a motor generator controller (ECN); a battery management system (BMS) sends a rechargeable power signal to the ECN; a gear controller SCU is responsible for collecting a gear recognition state signal, and sends the signal to the ECN; an electronic stability program module ESC collects the speed of the vehicle and an anti-lock braking system ABS status signal and transfers the speed of the vehicle and the anti-lock braking system ABS status signal to the ECN; and the ECN determines, according to the input signal (signals such as the depth of an accelerator pedal, the depth of the braking pedal, the gear, and the slope of a road), whether to enter/exit coasting feedback control with the accelerator pedal released, performs coasting feedback control according to a formulated feedback strategy, and at the same time sends the target torque signal of the engine unit to the ECM, sends a motor driving signal to the driving motor, sends a vehicle energy status signal to a combination meter, and the like.

Figure 23:
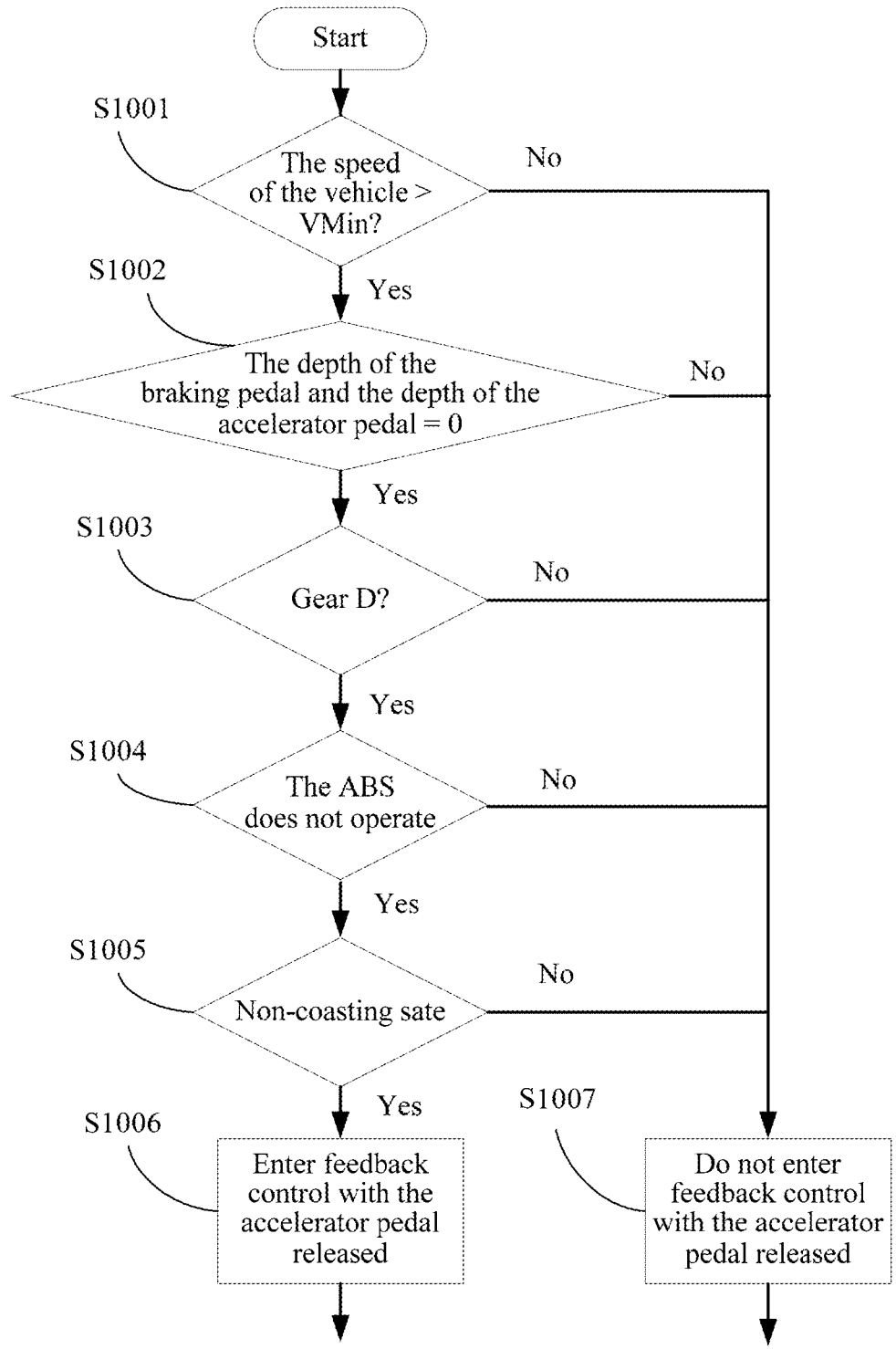
FIG. 23 is a flowchart of a vehicle entering a coasting feedback control mode when an accelerator pedal is released according to an embodiment of the present disclosure.

According to an embodiment of the present disclosure, as shown in FIG. 23, a procedure that the vehicle enters coasting feedback control mode with the accelerator pedal released includes:

S1001: Determine whether the speed of the vehicle is greater than a preset speed Vmin. If yes, perform Step S1002; or if not, perform Step S1007.

S1002: Determine whether the depth of the braking pedal and the depth of the accelerator pedal are 0. If yes, perform Step S1003; or if not, perform Step S1007.

S1003: Determine whether the current gear of the vehicle is gear D. If yes, perform Step S1004; or if not, perform Step S1007.

S1004: Determine whether the ABS does not operate. If yes, perform Step S1005; or if not, perform Step S1007.

S1005: Determine whether the vehicle is not in a cruise control mode. If yes, perform Step S1006; or if not, perform Step S1007.

S1006: The vehicle enters coasting feedback control with the accelerator pedal released, that is, controls the vehicle to enter the coasting feedback control mode.

S1007: The vehicle does not enter coasting feedback control with the accelerator pedal released.

In other words, In some embodiments of the present disclosure, the condition for the vehicle to enter the coasting feedback control mode is: The depth of an accelerator pedal is 0, the depth of the braking pedal is 0, the speed of the vehicle is greater than Vmin, the vehicle is in gear D, the vehicle is not in a cruise control mode, and the ABS is not started. The condition for the vehicle to exit the coasting feedback control mode is: The speed of the vehicle is less than or equal to Vmin or the depth of an accelerator pedal is greater than 0 or the depth of the braking pedal is greater than 0 or the ABS is started or the vehicle enters the cruise control mode or the vehicle is not in gear D. By determining the conditions to enter and exit the coasting feedback control with the accelerator pedal released, a path and a process to perform coasting feedback control of the vehicle may become clearer.

According to an embodiment of the present disclosure, the foregoing coasting feedback torque curve is obtained according to the operation mode of the vehicle, the current speed, the slope of the road, the economic region of the power system of the vehicle, and the ride comfort and the handling stability of the vehicle. Moreover, the coasting feedback torque curve may include a first coasting feedback torque curve, a second coasting feedback torque curve, and a third coasting feedback torque curve, where a feedback proportion of the second coasting feedback torque curve is greater than a feedback proportion of the first coasting feedback torque curve and is less than a feedback proportion of the third coasting feedback torque curve.

Figure 24:
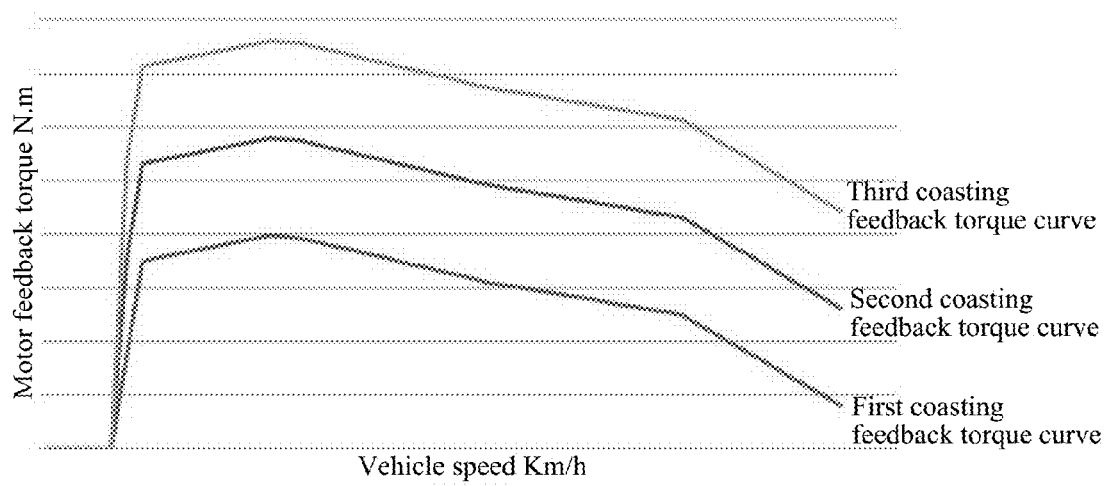
FIG. 24 is a schematic view of three optional coasting feedback torque curves according to an embodiment of the present disclosure.

In other words, in some embodiments of the present disclosure, factors such as the operation mode (the HEV or EV operation mode) of the vehicle, the speed of the vehicle, the slope of the road, the economic region of the power system (including the power battery, the motor generator controller, and the motor generator), and the ride comfort and the handling stability of the vehicle may be analyzed to fit the coasting feedback torque curve of the vehicle (where the economic efficiency is the primary focus, and the comfort is the secondary focus). As shown in FIG. 24, an embodiment of the present disclosure provides three optional coasting feedback torque curves (where, three coasting feedback torque curves are fitted according to a particular proportion δ, for example, δ=0.2). The coasting feedback torque curve having the lowest feedback proportion may be defined as the maximum comfort feedback torque curve, that is, the first coasting feedback torque curve; the coasting feedback torque curve fitted with an increase of δ times based on the maximum comfort feedback torque curve is the second-maximum comfort feedback torque curve, that is, the second coasting feedback torque curve; the coasting feedback torque curve fitted with a further increase of δ times based on the second-maximum comfort feedback torque curve is the maximum strength feedback torque curve, that is, the third coasting feedback torque curve. The default coasting feedback torque curve is initialized as the maximum comfort feedback torque curve. A user may make a selection to determine which coasting feedback torque curve is currently to use, so as to achieve the maximum feedback efficiency and the subjective comfort of the user is met.

According to an embodiment of the present disclosure, when the selected coasting feedback torque curve is the first coasting feedback torque curve or the second coasting feedback torque curve, coasting feedback control is performed on the second motor generator. When the selected coasting feedback torque curve is the third coasting feedback torque curve, coasting feedback control is simultaneously performed on the second motor generator and the first motor generator.

Figure 25:
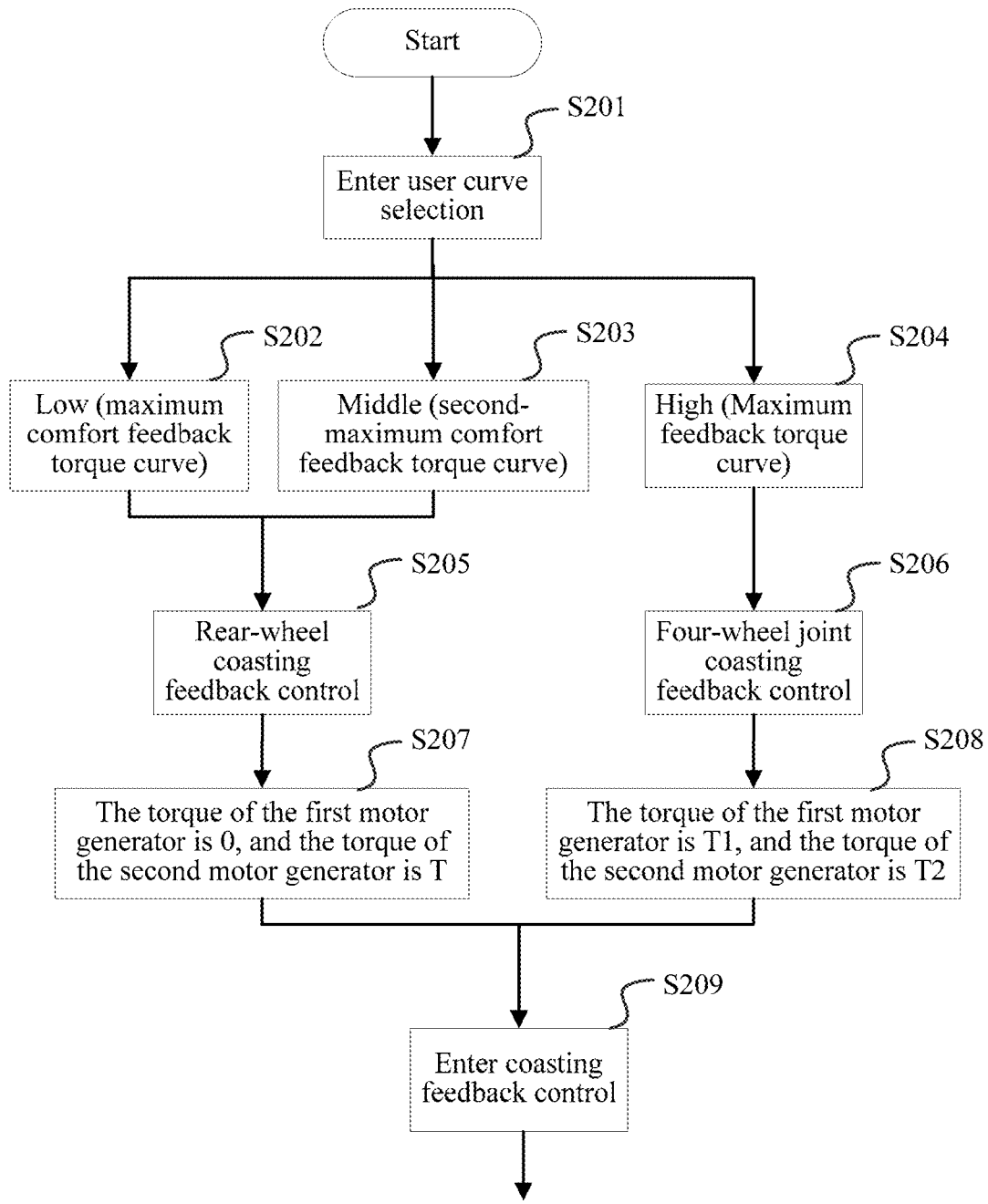
FIG. 25 is a flowchart of selection of a coasting feedback control curve by a user when an accelerator pedal of a vehicle is released according to an embodiment of the present disclosure.

According to an embodiment of the present disclosure, FIG. 25 is a flowchart of selection of a coasting feedback control curve of a vehicle by a user when an accelerator pedal is released according to an embodiment of the present disclosure. The user may select a coasting feedback torque curve according to information such as a current car state, so as to meet the economic efficiency and the subjective comfort during the running of the vehicle. Specific steps are as follows:

S201: The vehicle enters user curve selection, that is, determines, by using an input signal, that user has entered selection of a coasting feedback torque curve.

The user may select a coasting feedback torque curve that meets a current condition according to car status information such as the speed of the vehicle and the slope and also by taking comfort into consideration, so that desirable comfort is ensured while the economic efficiency is met as much as possible.

S202: Fit a first coasting feedback torque curve by analyzing factors such as the operation mode of the vehicle (the HEV or EV operation mode), the speed of the vehicle, the slope of the road, the economic region of the power system (including the power battery, the motor generator controller, and the motor generator), and the ride comfort and the handling stability of the vehicle, and the first coasting feedback torque curve has a low feedback value and may be defined as the maximum comfort feedback torque curve.

S203: Fit a second coasting feedback torque curve by analyzing factors such as the operation mode of the vehicle (the HEV or EV operation mode), the speed of the vehicle, the slope of the road, the economic region of the power system (including the power battery, the motor generator controller, and the motor generator), and the ride comfort and the handling stability of the vehicle, and the second coasting feedback torque curve has a middle feedback value and may be defined as the second-maximum comfort feedback torque curve.

S204: Fit a third coasting feedback torque curve by analyzing factors such as the operation mode of the vehicle (the HEV or EV operation mode), the speed of the vehicle, the slope of the road, the economic region of the power system (including the power battery, the motor generator controller, and the motor generator), and the ride comfort and the handling stability of the vehicle, and the third coasting feedback torque curve has a high feedback value and may be defined as the maximum strength feedback torque curve.

S205: If the user selects the coasting feedback torque curves having low and medium feedback values, that is, the maximum comfort feedback torque curve and the second-maximum comfort feedback torque curve, the vehicle uses rear-wheel drive in this case. In other words, coasting feedback control is performed on the second motor generator.

S206: If the user selects the coasting feedback torque curve having a high feedback value, that is, the maximum strength feedback torque curve, the vehicle mainly uses four-wheel drive (the rear-wheel drive is primary, and the front-wheel drive is secondary). In other words, coasting feedback control is simultaneously performed on the second motor generator and the first motor generator.

S207: If feedback is from the rear wheels, according to a formulated coasting feedback control strategy, the distribution of braking torques is: the torque of the first motor generator is 0, and the torque of the second motor generator is T.

S208: If feedback is from the four wheels, according to a formulated coasting feedback control strategy, the distribution of braking torques is: the torque of the first motor generator is T1, and the torque of the second motor generator is T2. The feedback torques of the front and rear wheels of the vehicle are distributed according to peak torque proportions of the front and rear motor generators.

S209: After the user selects a coasting feedback torque curve and the torque of the first motor generator and the torque of the second motor generator are distributed according to a formulated strategy, the vehicle enters coasting feedback control.

Therefore, in the coasting feedback control method for a vehicle in some embodiments of the present disclosure, during fitting of a coasting feedback torque curve of a vehicle, three different coasting feedback torque curves are fitted respectively by fully considering an operating condition of a road (the slope of the road, and the like) on which the vehicle is running, an economic region of a power system, the ride comfort and the steering capability of the vehicle and by also considering a different frictional force that the vehicle is subject to when the vehicle is in a different operation mode (HEV or EV operation mode). A user may select a corresponding feedback torque curve. The feedback torques of front and rear wheels are distributed according to peak torque proportions of front and rear motor generators and different proportions of feedback torques are distributed according to selection of a coasting feedback torque curve and according to a formulated control strategy. In this way, while requirements of different driving habits are met, not only energy recycling may be maximized, but also desirable driving comfort of the vehicle may be ensured.

According to an embodiment of the present disclosure, when the vehicle is in the coasting feedback control mode, a feedback limit value of the first motor generator and a feedback limit value of the second motor generator are obtained according to current running states of the first motor generator and the second motor generator; a feedback limit value of the motor generator controller is obtained according to a current running state of a motor generator controller of the vehicle; a current allowable charging power of the power battery is calculated according to a working state of the power battery, and a current feedback limit value of the power battery is obtained according to the current allowable charging power of the power battery; and the minimum feedback limit value of the feedback limit value of the first motor generator, the feedback limit value of the second motor generator, the feedback limit value of the motor generator controller, and the current feedback limit value of the power battery is obtained.

It should be noted that the feedback limit value of the first motor generator refers to a coasting feedback torque value that is allowed by the first motor generator and is obtained through calculation according to the running state (information such as the temperature, the rotating speed, and the power) of the first motor generator during coasting feedback control of the vehicle. Similarly, the feedback limit value of the second motor generator refers to a coasting feedback torque value that is allowed by the second motor generator and that is obtained through calculation according to the running state (information such as the temperature, the rotating speed, and the power) of the second motor generator during coasting feedback control of the vehicle. The feedback limit value of the motor generator controller refers to a coasting feedback torque value that is allowed by the motor generator controller and that is obtained through calculation according to the running state (stats of temperature, current, voltage, and the like) of the motor generator controller during coasting feedback control of the vehicle.

Moreover, a minimum target value during coasting feedback control of the vehicle is obtained according to the coasting feedback torque curve; a minimum feedback value of the vehicle is obtained according to the minimum feedback limit value and the minimum target value; and coasting feedback control is performed on the second motor generator according to the minimum feedback value or coasting feedback control is performed on the first motor generator and the second motor generator.

When coasting feedback control is performed on the first motor generator and the second motor generator or coasting feedback control is performed on the second motor generator, a target torque of the engine unit is sent to an ECM, and the ECM controls the engine unit according to the target torque.

Figure 26:
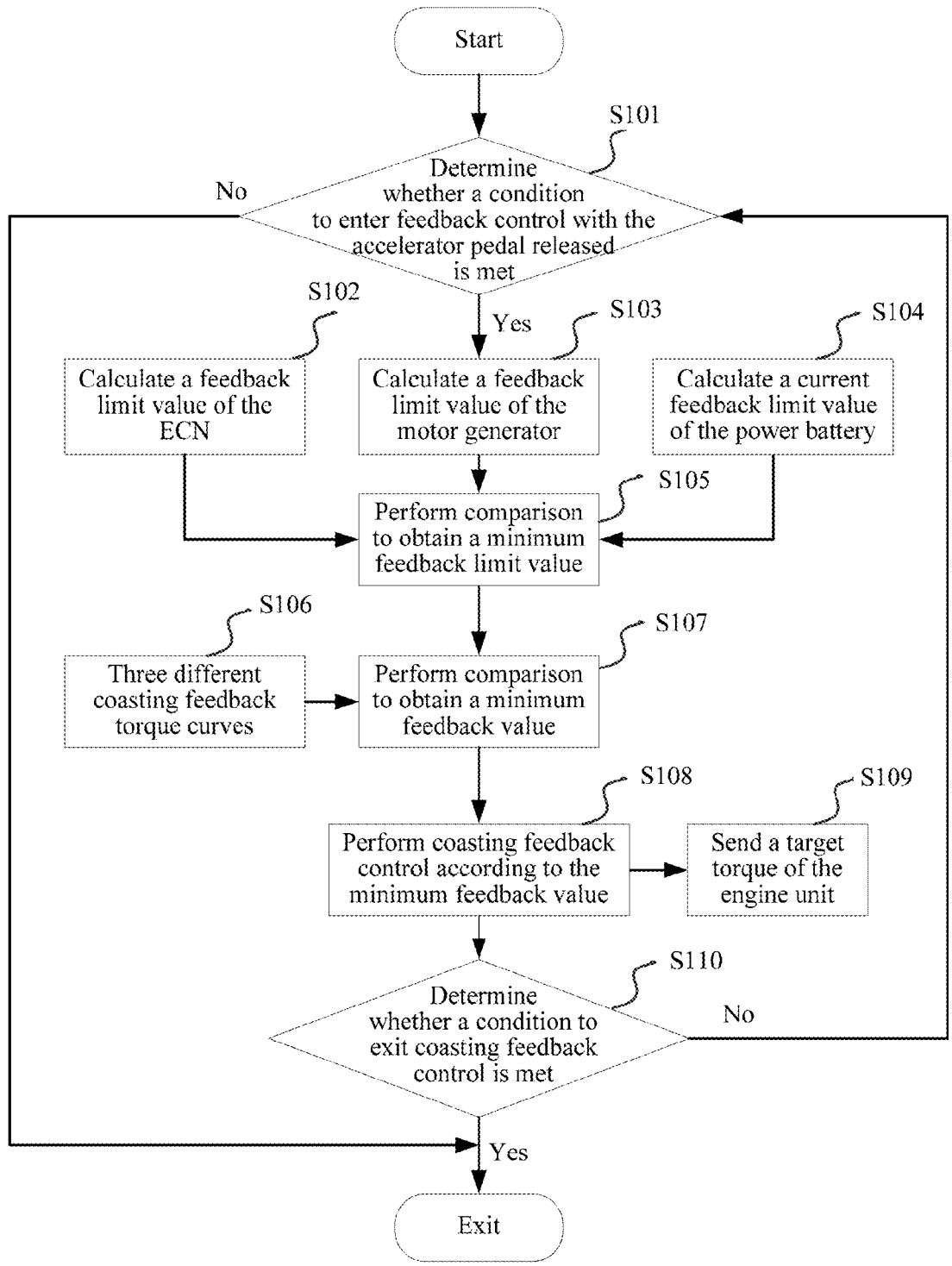
FIG. 26 is a detailed flowchart of coasting feedback control of a vehicle according to an embodiment of the present disclosure.

FIG. 26 is a specific procedure of coasting feedback control of a vehicle according to an embodiment of the present disclosure. According to feedback limits of the motor generators and the motor generator controllers, and in combination with feedback limit of the power battery, and vehicle status information such as the status of system related modules (such as the ESC and the cruise module), various input information is fully and accurately analyzed and considered, control strategies of various stages are optimized, and a feedback torque during coasting with the accelerator pedal released is controlled in a centralized manner, so that the vehicle has desirable economic efficiency, ride comfort, and handling stability. As shown in FIG. 26, specific steps of coasting feedback control of the vehicle are as follows:

S101: Determine, by using an input signal, whether a condition to enter coasting feedback control with the accelerator pedal released is met, where the meeting the condition to enter coasting feedback control is: the speed of the vehicle>Vmin, both the depth of the accelerator pedal and the depth of the braking pedal are 0, the ABS is in a non-working state, the cruise function of the vehicle is in a non-working state, and the current gear of the vehicle is gear D.

S102: Monitor a current running state (states of the temperature, current, voltage, and the like) of the motor generator controller ECN, and calculating a feedback limit value of the ECN.

S103: Monitor current running states (information such as the temperature, the rotating speed, and the power) of the first motor generator and the second motor generator, and calculate a feedback limit value of the first motor generator and a feedback limit value of the second motor generator.

S104: The BMS monitors the state of each single battery in the power battery, calculates a current rechargeable power of the power battery, and calculates the current feedback limit value of the power battery according to the allowable charging power of the power battery.

S105: Compare the feedback limit values of Steps S102, S103, and S104 to obtain the minimum feedback limit value.

S106: Fit three different coasting feedback torque curves (as shown in FIG. 24) by analyzing the operation mode (HEV or EV operation mode) of the vehicle, the speed of the vehicle, the slope of the road, the economic region of the power system (including the power battery, the motor generator controller, and the motor generator), the ride comfort and the handling stability of the vehicle, and use the coasting feedback torque curves as input target values of coasting feedback control, and obtain the minimum target value during coasting feedback control of the vehicle.

S107: Compare the minimum feedback values in S105 and S106.

S108: Drive the motor to perform coasting feedback control according to the minimum feedback value obtained through comparison in S107, charge the electric energy into the power battery, and simultaneously provide a frictional force to the wheels, to achieve the objective of reducing the speed of the vehicle.

S109: While executing coasting feedback control, the ECN sends a target torque signal of the engine unit to the ECM.

S110: Determine, by using the input signal, whether the condition to exit coasting feedback control with the accelerator pedal released is met, and the meeting the condition to exit coasting feedback control is: the speed of the vehicle is less than or equal to Vmin or the depth of an accelerator pedal>0 or the depth of the braking pedal is greater than 0 or the ABS is in a working state or the cruise function of the vehicle is in a working state or the current gear of the vehicle is not gear D.

In some embodiments of the present disclosure, the various input information is fully and accurately analyzed and considered, and control strategies in various stages are optimized, so that the coasting feedback control of the vehicle is greatly improved in aspects such as safety, economic efficiency, and steering capability.

Therefore, in some embodiments of the present disclosure, when the vehicle is coasting in an EV/HEV operation mode in gear D with the accelerator pedal released, the vehicle has consistent ride comfort and handling stability, a driver has desirable subjective experience, driving comfort is great, energy recycling is maximized, the feedback system is in a high efficiency region, and the mileage can also be desirably increased.

In another embodiment of the present disclosure, optimized control of the torque during energy feedback may be further performed, and it is ensured that the trends of the braking acceleration and the acceleration change rate after an energy feedback effect is implemented are close to the effects of the original vehicle, so that it feels similar to the original vehicle during feedback, thus maintaining the smoothness during vehicle feedback.

For the coasting feedback control method for a vehicle according to embodiments of the present disclosure, during coasting feedback control of the vehicle, a coasting feedback torque of the first motor generator and a coasting feedback torque of the second motor generator are distributed according to a selected coasting feedback torque curve of the vehicle, so that the feedback efficiency of the vehicle, the operation mode of the vehicle, the ride comfort and the steering capability of the vehicle, and the like may be fully considered, and the energy recycling can be maximized in the premise of ensuring the driving comfort of the vehicle, thus effectively increasing the mileage of the vehicle, reducing the discharge of pollutants and the wear caused by mechanical braking, and increasing the energy feedback efficiency of the vehicle. Meanwhile, In some embodiments of the present disclosure, power output by the engine unit and/or a first motor generator may be output to an output unit via a power switching device, and the output unit then outputs the power to at least one of front and rear wheels of the vehicle. Further, because of the provision of a second motor generator, the second motor generator may perform torque compensation on at least one of front and rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases. In addition, the method is simple and reliable and is easy to implement.

Figure 27:
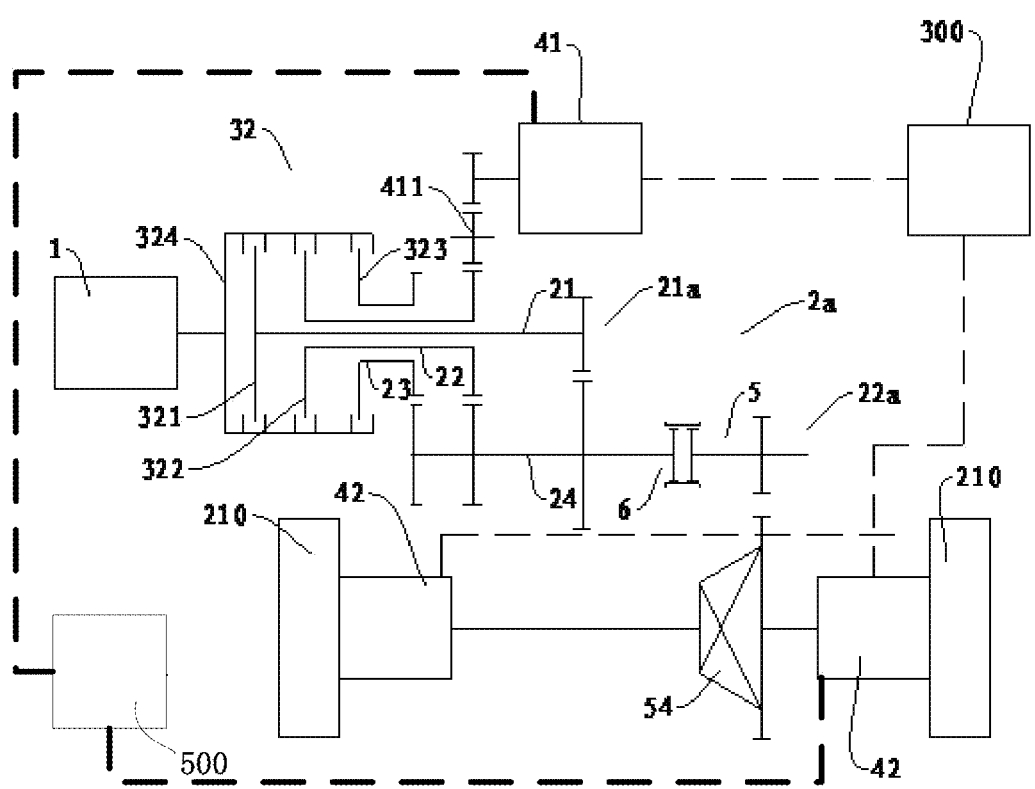
FIG. 27 is a schematic view of a vehicle according to an embodiment of the present disclosure.

In addition, embodiments of the present disclosure further provide a vehicle. As shown in FIG. 27, the vehicle includes: an engine unit 1; a transmission unit 2a, where the transmission unit 2a is adapted to selectively couple with the engine unit 1 and also configured to transmit the power generated by the engine unit 1; a first motor generator 41, where the first motor generator 41 is coupled with the transmission unit 2a; an output unit 5, where the output unit 5 is configured to transmit the power transmitted by the transmission unit 2a to at least one of front and rear wheels of the vehicle; a power switching device (e.g., a synchronizer 6), where the power switching device (e.g., the synchronizer 6) is adapted to enable or interrupt power transmission between the transmission unit 2a and the output unit 5; a second motor generator 42, where the second motor generator 42 is configured to drive at least one of the front and rear wheels; a power battery 300, where the power battery 300 is respectively connected to the first motor generator 41 and the second motor generator 42 to supply power to the first motor generator 41 and the second motor generator 42; and a controller 500, where when the current speed of the vehicle is greater than a preset speed, both the depth of the braking pedal and the depth of the accelerator pedal of the vehicle are 0, the current gear of the vehicle is gear D, the vehicle is not in a cruise control mode, and an anti-lock braking system of the vehicle is in a non-working state, the controller 500 controls the vehicle to enter the coasting feedback control mode, and when the vehicle is in the coasting feedback control mode, the controller 500 distributes a coasting feedback torque of the first motor generator 41 and a coasting feedback torque of the second motor generator 42 according to a selected coasting feedback torque curve of the vehicle. In addition, for other components shown in FIG. 27, reference may be made to the description in the embodiment corresponding to FIG. 8.

The power switching device is configured as a synchronizer 6, and the synchronizer 6 is adapted to selectively synchronize between the output unit 5 and the transmission unit 2a.

According to an embodiment of the present disclosure, the controller 500 obtains the coasting feedback torque curve according to an operation mode of the vehicle, the current speed, the slope of a road, an economic region of a power system of the vehicle, and the ride comfort and the handling stability of the vehicle.

Moreover, the coasting feedback torque curve includes a first coasting feedback torque curve, a second coasting feedback torque curve, and a third coasting feedback torque curve, where the feedback proportion of the second coasting feedback torque curve is greater than the feedback proportion of the first coasting feedback torque curve and is less than the feedback proportion of the third coasting feedback torque curve.

According to an embodiment of the present disclosure, when the selected coasting feedback torque curve is the first coasting feedback torque curve or the second coasting feedback torque curve, the controller 500 performs coasting feedback control on the second motor generator 42; and when the selected coasting feedback torque curve is the third coasting feedback torque curve, the controller 500 performs coasting feedback control on the second motor generator 42 and the first motor generator 41 at the same time.

According to an embodiment of the present disclosure, when the vehicle is in the coasting feedback control mode, the controller 500 obtains a feedback limit value of the first motor generator 41 and a feedback limit value of the second motor generator 42 according to current running states of the first motor generator 41 and the second motor generator 42, obtains a feedback limit value of the motor generator controller according to a current running state of a motor generator controller of the vehicle, and obtains a current feedback limit value of the power battery 300 according to a current allowable charging power of the power battery 300, where the controller 500 compares the feedback limit value of the first motor generator 41, the feedback limit value of the second motor generator 42, the feedback limit value of the motor generator controller, and the current feedback limit value of the power battery 300 to obtain the minimum feedback limit value of the feedback limit value of the first motor generator 41, the feedback limit value of the second motor generator 42, the feedback limit value of the motor generator controller, and the current feedback limit value of the power battery 300.

Moreover, the controller 500 further obtains a minimum target value according to the coasting feedback torque curve during coasting feedback control of the vehicle, obtains a minimum feedback value of the vehicle according to the minimum feedback limit value and the minimum target value, and performs, according to the minimum feedback value, coasting feedback control on the second motor generator 42 or coasting feedback control on the first motor generator 41 and the second motor generator 42.

According to an embodiment of the present disclosure, when coasting feedback control is performed on the first motor generator 41 and the second motor generator 42 or coasting feedback control is performed on the second motor generator 42, the controller 500 sends a target torque of the engine unit 1 to an ECM, and the ECM performs control on the engine unit 1 according to the target torque.

For the vehicle according to embodiments of the present disclosure, during coasting feedback control, a coasting feedback torque of the first motor generator and a coasting feedback torque of the second motor generator can be distributed according to a selected coasting feedback torque curve of the vehicle. Therefore, the energy feedback efficiency, the operation mode, the ride comfort and steering capability, and the like may be fully considered, and energy recycling can be maximized in the premise of ensuring the driving comfort, thus effectively increasing the mileage, reducing the discharge of pollutants and the wear caused by mechanical braking, and increasing energy feedback efficiency. Meanwhile, in some embodiments of the present disclosure, power output by the engine unit and/or a first motor generator may be output to an output unit via a power switching device, and the output unit then outputs the power to at least one of front and rear wheels of the vehicle. Further, because of the provision of a second motor generator, the second motor generator may perform torque compensation on at least one of front and rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

Any processes or methods described in the flowcharts or in other manners may be understood as modules, segments or parts of code including one or more executable instructions configured to implement steps of specific logic functions or processes, and the scope of the preferred implementation manners of the present disclosure includes other implementations. The functions may be executed in an order other than those shown or discussed. For example, the functions are executed substantially at the same time according to the involved functions or the functions are executed in an opposite order, which should be understood by those skilled in the art to which embodiments of the present disclosure belong.

The logic and/or steps represented in the flowcharts or described herein in other manners may be, for example, regarded as a sequenced list of executable instructions for implementing logic functions, and may be specifically implemented in any computer readable medium for use by instruction execution systems, devices or equipment (for example, a computer-based system, a system including a processor or another system that may take an instruction from instruction execution systems, devices or equipment and execute the instruction), or for use in combination with these instruction execution systems, devices or equipment. As for this specification, the "computer readable medium" may be any device that may include, store, communicate, propagate or transmit a program for use by instruction execution systems, devices or equipment or for use in combination with these instruction execution systems, devices or equipment. A more specific example (a non-exclusive list) of the computer readable medium includes the following: an electronic connection portion (electronic device), a portable computer cassette (magnetic device), a random access memory (RAM), a read-only memory (ROM), an erasable programmable read-only memory (EPROM or flash-drive memory), a fiber device, and a compact disc read-only memory (CDROM) having one or more cables. In addition, the computer readable medium may even be paper or another suitable medium on which the program is printed, because, for example, optical scanning may be performed on the paper or the another medium, the program is then obtained in an electronic manner by means of editing, deciphering or processing in another suitable manner when necessary, and the program is stored in a computer memory.

It would be appreciated that the parts of the present disclosure may be implemented by using hardware, software, firmware or a combination thereof. In the foregoing implementation manner, multiple steps or methods may be implemented by using software or firmware that is stored in a memory and executed by a suitable instruction execution system. For example, during implementation of hardware, as in any another implementation manner, any one or a combination of the following technologies well known in the art may be used for implementation: a discrete logic circuit having a logic gate circuit configured to implement a logic function on a data signal, an application-specific integrated circuit having a suitable combinational logic gate circuit, a programmable gate array (PGA), a field-programmable gate array (FPGA), and the like.

Those skilled in the art may understand that implementation of all or some of the steps carried in the methods in the foregoing embodiments may be accomplished by using a program instructing related hardware, and the program may be stored in a computer readable store medium. When the program is run, one or a combination of the steps in the method embodiments is included.

In addition, various functional units in various embodiments of the present disclosure may be integrated in one processing module, or various units may exist separately in a physical form, or two or more units may be integrated in one module. The foregoing integrated module may be implemented in the form of hardware, or may be implemented in the form of a software function module. When the integrated module is implemented in the form of a software functional module and sold or used as an independent product, the integrated module may be stored in a computer-readable storage medium.

The storage medium mentioned in the foregoing may be a read-only memory, a disk, a disc or the like.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiment," "in some embodiments", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that various changes, modifications, replacements and alternatives can be made to the embodiments without departing from the principles and spirit of the present disclosure, and the scope of the present disclosure is as defined by the appended claims and equivalents thereof.

What is claimed is:

1. A coasting feedback control method for a vehicle, wherein the vehicle comprises an engine unit, a transmission unit adapted to selectively couple with the engine unit and configured to transmit power generated by the engine unit, a first motor generator coupled with the transmission unit, an output unit, a power switching device, a second motor generator configured to drive at least one of front and rear wheels of the vehicle, and a power battery for supplying power to the first motor generator and the second motor generator, wherein the output unit is configured to transmit the power transmitted by the transmission unit to at least one of the front and rear wheels of the vehicle, the power switching device is adapted to enable or interrupt power transmission between the transmission unit and the output unit, and the coasting feedback control method comprises the following steps:

detecting a current speed of the vehicle and a depth of a braking pedal and a depth of an accelerator pedal of the vehicle; and when the current speed of the vehicle is greater than a preset speed, both the depth of the braking pedal and the depth of the accelerator pedal are 0, a current gear of the vehicle is gear D, the vehicle is not in a cruise control mode, and an anti-lock braking system of the vehicle is in a non-working state, controlling the vehicle to enter a coasting feedback control mode, wherein when the vehicle is in the coasting feedback control mode, a coasting feedback torque of the first motor generator and a coasting feedback torque of the second motor generator are distributed according to a selected coasting feedback torque curve of the vehicle.

2. The coasting feedback control method for a vehicle according to claim 1, wherein the coasting feedback torque curve is obtained according to an operation mode of the vehicle, the current speed, the slope of a road, and an economic region of a power system of the vehicle.

3. The coasting feedback control method for a vehicle according to claim 2, wherein the coasting feedback torque curve comprises a first coasting feedback torque curve, a second coasting feedback torque curve, and a third coasting feedback torque curve, wherein a feedback proportion of the second coasting feedback torque curve is greater than a feedback proportion of the first coasting feedback torque curve and is less than a feedback proportion of the third coasting feedback torque curve.

4. The coasting feedback control method for a vehicle according to claim 3, wherein
when the selected coasting feedback torque curve is the first coasting feedback torque curve or the second coasting feedback torque curve, coasting feedback control is performed on the second motor generator; and
when the selected coasting feedback torque curve is the third coasting feedback torque curve, coasting feedback control is simultaneously performed on the second motor generator and the first motor generator.

5. The coasting feedback control method for a vehicle according to claim 1, wherein when the vehicle is in the coasting feedback control mode, wherein
a feedback limit value of the first motor generator and a feedback limit value of the second motor generator are obtained according to current running states of the first motor generator and the second motor generator;
a feedback limit value of the motor generator controller is obtained according to a current running state of a motor generator controller of the vehicle;
a current allowable charging power of the power battery is calculated according to a working state of the power battery, and a current feedback limit value of the power battery is obtained according to the current allowable charging power of the power battery; and
a minimum feedback limit value of the feedback limit value of the first motor generator, the feedback limit value of the second motor generator, the feedback limit value of the motor generator controller, and the current feedback limit value of the power battery is obtained.

6. The coasting feedback control method for a vehicle according to claim 5, wherein
a minimum target value during coasting feedback control of the vehicle is obtained according to the coasting feedback torque curve;
a minimum feedback value of the vehicle is obtained according to the minimum feedback limit value and the minimum target value; and
according to the minimum feedback value, coasting feedback control is performed on the second motor generator or coasting feedback control is performed on the first motor generator and the second motor generator.

7. The coasting feedback control method for a vehicle according to claim 6, wherein when coasting feedback control is performed on the first motor generator and the second motor generator or when coasting feedback control is performed on the second motor generator, a target torque of the engine unit is sent to an engine control module (ECM), and the ECM controls the engine unit according to the target torque.

8. A vehicle, comprising:
an engine unit;
a transmission unit adapted to selectively couple with the engine unit and also configured to transmit the power generated by the engine unit;
a first motor generator coupled with the transmission unit;
an output unit configured to transmit the power transmitted by the transmission unit to at least one of the front and rear wheels of the vehicle;
a power switching device adapted to enable or interrupt power transmission between the transmission unit and the output unit;
a second motor generator configured to drive at least one of the front and rear wheels;
a power battery respectively connected to the first motor generator and the second motor generator to supply power to the first motor generator and the second motor generator; and
a controller, wherein when a current speed of the vehicle is greater than a preset speed and both a depth of the braking pedal and a depth of the accelerator pedal of the vehicle are 0, the current gear of the vehicle is gear D, the vehicle is not in a cruise control mode, and an anti-lock braking system of the vehicle is in a non-working state, the controller controls the vehicle to enter a coasting feedback control mode, and when the vehicle is in the coasting feedback control mode, the controller distributes a coasting feedback torque of the first motor generator and a coasting feedback torque of the second motor generator according to a selected coasting feedback torque curve of the vehicle.

9. The vehicle according to claim 8, wherein the power switching device is configured as a synchronizer, and the synchronizer is adapted to selectively synchronize between the output unit and the transmission unit.

10. The vehicle according to claim 8, wherein the controller obtains the coasting feedback torque curve according to an operation mode of the vehicle, the current speed, the slope of a road, and an economic region of a power system of the vehicle.

11. The vehicle according to claim 10, wherein the coasting feedback torque curve comprises a first coasting feedback torque curve, a second coasting feedback torque curve, and a third coasting feedback torque curve, wherein a feedback proportion of the second coasting feedback torque curve is greater than a feedback proportion of the first coasting feedback torque curve and is less than a feedback proportion of the third coasting feedback torque curve.

12. The vehicle according to claim 11, wherein
when the selected coasting feedback torque curve is the first coasting feedback torque curve or the second coasting feedback torque curve, the controller performs coasting feedback control on the second motor generator; and
when the selected coasting feedback torque curve is the third coasting feedback torque curve, the controller performs coasting feedback control on the second motor generator and the first motor generator simultaneously.

13. The vehicle according to claim 11, wherein when the vehicle is in the coasting feedback control mode, the controller obtains a feedback limit value of the first motor generator and a feedback limit value of the second motor generator according to current running states of the first motor generator and the second motor generator, obtains a feedback limit value of the motor generator controller according to a current running state of a motor generator controller of the vehicle, and obtains a current feedback limit value of the power battery according to a current allowable charging power of the power battery, wherein the controller compares the feedback limit value of the first motor generator, the feedback limit value of the second motor generator, the feedback limit value of the motor generator controller, and the current feedback limit value of the power battery to obtain a minimum feedback limit value of the feedback limit value of the first motor generator, the feedback limit value of the second motor generator, the feedback limit value of the motor generator controller, and the current feedback limit value of the power battery.

14. The vehicle according to claim 13, wherein the controller further obtains a minimum target value during coasting feedback control of the vehicle according to the coasting feedback torque curve, obtains a minimum feedback value of the vehicle according to the minimum feedback limit value and the minimum target value, and performs, according to the minimum feedback value, coasting feedback control on the second motor generator or coasting feedback control on the first motor generator and the second motor generator.

15. The vehicle according to claim 14, wherein when coasting feedback control is performed on the first motor generator and the second motor generator or when coasting feedback control is performed on the second motor generator, the controller sends a target torque of the engine unit to an engine control module (ECM), and the ECM controls the engine unit according to the target torque.

16. A coasting feedback control method for a vehicle, wherein the vehicle comprises an engine unit, a transmission unit adapted to selectively couple with the engine unit and configured to transmit power generated by the engine unit, a first motor generator coupled with the transmission unit, a second motor generator configured to drive at least one of front and rear wheels of the vehicle, and a power battery for supplying power to the first motor generator and the second motor generator, the method comprising:
    entering a coasting feedback control mode, in which a coasting feedback torque of the first motor generator and a coasting feedback torque of the second motor generator are distributed according to a selected coasting feedback torque curve of the vehicle.

17. The coasting feedback control method for a vehicle according to claim 16, wherein the coasting feedback torque curve is obtained according to an operation mode of the vehicle, a current speed, a slope of a road, and an economic region of a power system of the vehicle.

18. The coasting feedback control method for a vehicle according to claim 17, wherein the coasting feedback torque curve comprises a first coasting feedback torque curve, a second coasting feedback torque curve, and a third coasting feedback torque curve, wherein a feedback proportion of the second coasting feedback torque curve is greater than a feedback proportion of the first coasting feedback torque curve and is less than a feedback proportion of the third coasting feedback torque curve.

19. The coasting feedback control method for a vehicle according to claim 18, wherein
    when the selected coasting feedback torque curve is the first coasting feedback torque curve or the second coasting feedback torque curve, coasting feedback control is performed on the second motor generator; and
    when the selected coasting feedback torque curve is the third coasting feedback torque curve, coasting feedback control is simultaneously performed on the second motor generator and the first motor generator.

20. The coasting feedback control method for a vehicle according to claim 16, wherein when the vehicle is in the coasting feedback control mode, wherein
    a feedback limit value of the first motor generator and a feedback limit value of the second motor generator are obtained according to current running states of the first motor generator and the second motor generator.

* * * * *